United States Patent
Gupta et al.

(10) Patent No.: US 12,047,616 B2
(45) Date of Patent: *Jul. 23, 2024

(54) SYSTEMS AND METHODS FOR PROVIDING CONTENT DURING REDUCED STREAMING QUALITY

(71) Applicant: Rovi Guides, Inc., San Jose, CA (US)

(72) Inventors: Vikram Makam Gupta, Karnataka (IN); Vishwas Sharadanagar Panchaksharaiah, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/507,503

(22) Filed: Oct. 21, 2021

(65) Prior Publication Data
US 2022/0046297 A1   Feb. 10, 2022

Related U.S. Application Data

(63) Continuation of application No. 16/557,936, filed on Aug. 30, 2019, now Pat. No. 11,184,648.

(51) Int. Cl.
*H04N 21/234* (2011.01)
*H04N 21/2343* (2011.01)
*H04N 21/24* (2011.01)
*H04N 21/44* (2011.01)

(52) U.S. Cl.
CPC .  *H04N 21/23406* (2013.01); *H04N 21/23418* (2013.01); *H04N 21/2343* (2013.01); *H04N 21/2401* (2013.01); *H04N 21/2402* (2013.01); *H04N 21/44004* (2013.01)

(58) Field of Classification Search
CPC ..... G06F 3/0635; G06F 18/22; H04N 21/812; H04N 21/23406; H04N 7/15; H04N 19/159; H04N 21/4331; H04N 21/47202; H04L 65/762; G11B 27/034; G11B 27/036; G11B 27/34; G11B 27/3027; H04W 24/08; G06T 1/0092
See application file for complete search history.

(56) References Cited

U.S. PATENT DOCUMENTS

| | | | |
|---|---|---|---|
| 5,457,495 A | | 10/1995 | Hartung |
| 5,784,528 A | * | 7/1998 | Yamane ............ G11B 27/3027 |
| 5,801,765 A | | 9/1998 | Gotoh et al. |
| 5,819,004 A | * | 10/1998 | Azadegan ............ H04N 19/159 |
| | | | 375/E7.235 |
| 6,005,600 A | | 12/1999 | Hill |
| 6,026,232 A | * | 2/2000 | Yogeshwar ............ G11B 27/34 |
| | | | 715/810 |

(Continued)

*Primary Examiner* — Dustin Nguyen
(74) *Attorney, Agent, or Firm* — Haley Guiliano LLP

(57) ABSTRACT

Systems and methods are described herein for providing content during reduced streaming quality. Data streaming is susceptible to degradation in quality that adversely affects the delivery of content. For example, sufficient reduction in streaming quality can cause video and audio portions of a data stream to become unsynchronized. The system compares currently streamed video frames to previously received video frames to identify suitable replacement video frames for the currently streamed video frames in the event that the currently streamed video frames are affected by the sufficiently reduced streaming quality.

26 Claims, 8 Drawing Sheets

(56) References Cited

U.S. PATENT DOCUMENTS

| | | | |
|---|---|---|---|
| 6,192,079 B1 | 2/2001 | Sharma et al. | |
| 6,192,080 B1 | 2/2001 | Sun et al. | |
| 6,747,991 B1 | 6/2004 | Hemy et al. | |
| 6,778,211 B1 | 8/2004 | Zimmermann et al. | |
| 6,920,181 B1 | 7/2005 | Porter | |
| 6,985,174 B1 | 1/2006 | Thompson et al. | |
| 7,023,924 B1 | 4/2006 | Keller et al. | |
| 7,885,514 B2 | 2/2011 | Lin et al. | |
| 8,238,420 B1 | 8/2012 | Shankarappa | |
| 8,381,244 B2* | 2/2013 | King | H04N 21/23406 725/35 |
| 8,942,542 B1 | 1/2015 | Sherrets et al. | |
| 9,325,544 B2 | 4/2016 | Fazeldehkordi et al. | |
| 10,310,928 B1* | 6/2019 | Hegar | G06F 3/0635 |
| 10,986,378 B2 | 4/2021 | Gupta et al. | |
| 11,005,909 B2 | 5/2021 | Gupta et al. | |
| 2003/0110508 A1 | 6/2003 | Bridgelall | |
| 2005/0078206 A1 | 4/2005 | Kim et al. | |
| 2006/0130121 A1 | 6/2006 | Candelore et al. | |
| 2006/0140575 A1 | 6/2006 | Fuchigami et al. | |
| 2006/0218602 A1* | 9/2006 | Sherer | H04N 21/47202 348/E7.071 |
| 2006/0274827 A1 | 12/2006 | Aoyagi | |
| 2008/0062163 A1 | 3/2008 | Uchida et al. | |
| 2008/0187282 A1 | 8/2008 | Brady et al. | |
| 2008/0232765 A1 | 9/2008 | Patten et al. | |
| 2008/0310722 A1 | 12/2008 | Daniels et al. | |
| 2009/0016435 A1 | 1/2009 | Brandsma et al. | |
| 2009/0034610 A1 | 2/2009 | Lee et al. | |
| 2009/0034937 A1 | 2/2009 | Kusunoki et al. | |
| 2009/0060458 A1 | 3/2009 | Bauchot et al. | |
| 2009/0300480 A1* | 12/2009 | Cohen | G11B 27/034 707/999.107 |
| 2010/0046634 A1 | 2/2010 | Dai et al. | |
| 2010/0088717 A1* | 4/2010 | Candelore | H04N 21/812 725/110 |
| 2011/0129116 A1* | 6/2011 | Thorwirth | G06T 1/0092 382/100 |
| 2011/0222556 A1 | 9/2011 | Shefler et al. | |
| 2012/0008045 A1 | 1/2012 | Yao | |
| 2012/0173662 A1 | 7/2012 | Hickey et al. | |
| 2012/0207225 A1 | 8/2012 | Jeong | |
| 2012/0281965 A1 | 11/2012 | Hunt et al. | |
| 2013/0055316 A1 | 2/2013 | Brisebois et al. | |
| 2013/0141530 A1 | 6/2013 | Zavesky | |
| 2014/0016696 A1 | 1/2014 | Nelson et al. | |
| 2015/0150062 A1* | 5/2015 | Guerrera | H04N 21/4331 725/95 |
| 2015/0279424 A1* | 10/2015 | Marck | G11B 27/036 386/285 |
| 2015/0334156 A1* | 11/2015 | Juilliart | H04N 7/15 348/14.12 |
| 2015/0341410 A1* | 11/2015 | Schrempp | G06F 18/22 709/231 |
| 2016/0080835 A1 | 3/2016 | Von Sneidern et al. | |
| 2016/0088054 A1* | 3/2016 | Hassan | H04L 65/762 709/219 |
| 2018/0005026 A1 | 1/2018 | Shaburov et al. | |
| 2018/0192086 A1 | 7/2018 | Henaire et al. | |
| 2018/0262815 A1 | 9/2018 | Wang | |
| 2018/0288499 A1 | 10/2018 | Niemeyer et al. | |
| 2018/0357317 A1 | 12/2018 | Santiago | |
| 2019/0172499 A1 | 6/2019 | Bodziony et al. | |
| 2019/0215542 A1 | 7/2019 | Gandhi et al. | |
| 2019/0312797 A1* | 10/2019 | Sen | H04W 24/08 |
| 2020/0020342 A1 | 1/2020 | Tiwari | |
| 2020/0084342 A1 | 3/2020 | Maker | |
| 2020/0084491 A1 | 3/2020 | Asnis et al. | |
| 2020/0126559 A1 | 4/2020 | Ochshorn et al. | |

\* cited by examiner

SYSTEMS AND METHODS FOR PROVIDING CONTENT DURING REDUCED STREAMING QUALITY

CROSS-REFERENCE TO RELATED APPLICATIONS

This application is a continuation of U.S. patent application Ser. No. 16/557,936, filed Aug. 30, 2019, the disclosure of which is hereby incorporated by reference herein in its entirety.

BACKGROUND OF THE INVENTION

The present disclosure is directed to digital content delivery, and more particularly, to providing content based on the quality of a data stream used to deliver the content.

SUMMARY

Streaming services are increasingly preferred over traditional content delivery services, such as broadcast cable and DVD rentals. Streaming services allow users convenience and flexibility when consuming content. For example, a user who is waiting for a flight uses the Wi-Fi at the airport and a streaming service such as Netflix to watch a television program from his mobile phone. However, the content consumption experience is highly dependent on the quality of the wireless network when content is streamed to a device. For example, the data rate at which wireless networks provide content items to devices may fluctuate and fail to provide users with a consistent, high-quality content consumption experience. For example, in densely populated areas, the data rate provided by a Wi-Fi access point to devices may depend on the number of devices being serviced by the access point. The user watching a program on Netflix while waiting at the airport may notice that, as more travelers begin connecting their devices to the Wi-Fi network, his stream of the program is taking more time to stop and buffer the program (e.g., the device is showing a buffering notification). In some embodiments, prioritizing providing audio over providing video during periods of reduced streaming quality is preferred but may cause the user to receive audio that is not synchronized with the video. Disruptions to content consumption due to communication network limitations are frustrating to users and discourage them from using streaming services. In order to address these issues, a content application is provided that provides alternative video content during periods of reduced streaming quality that negatively affects the display of a video stream.

Systems and methods are described herein for providing content during reduced streaming quality. In one embodiment, a device uses a content application to receive a content item including video frames and audio using a data stream. The content application determines that the quality of streaming the video frames has reduced such that the presentation of the video frames and the audio are not synchronized. A previously stored video frame is used to replace a video frame affected by the reduced streaming quality. The content application determines a previously stored video frame of the video frames is similar to a currently streamed video frame affected by the reduced streaming quality. Based on this determination, the content application replaces the currently streamed video frame of the video frames with the previously stored video frame while continuing to provide the audio. As such, the previously stored video frame is being displayed in place of any streaming video that would otherwise have been displayed had the quality of the data stream been sufficient.

To determine that the quality of streaming the video frames has reduced such that a synchronization between the video frames and the audio cannot be maintained, the content application may determine that a bit rate at which the content item is received using the data stream has decreased. In some embodiments, the content application monitors the data rate or bit rate of a downlink path between a transmitter providing a content item and a device in a communication network. The content application may observe trends in the downlink bit rate to determine when the downlink bit rate has decreased sufficiently to warrant determining a previously stored video frame to replace the currently streamed video frame affected by the decreased bit rate or identifying a stored video set to replace the currently streamed video. In some embodiments, the content application uses a bit rate threshold to compare with the bit rate of the data stream to determine that the streaming quality is reduced such that the synchronization between the streamed video frames and audio cannot be maintained.

In some embodiments, the content application stores previously received video frames of the content item. The stored set of video frames that is used to replace the stream of video frames is selected from these previously received and stored video frames. To determine that the previously stored video frame of the video frames is similar to the currently streamed video frame, the content application may compare the currently streamed video frame to the stored video frames. In some implementations, the content application compares the currently streamed video frame and the previously stored video frame and determines that the comparison indicates a continuity of a scene. For example, the content application may compare the scene of the currently streamed video frame having actors in a park to the scenes of the stored video frames that include the park, a classroom, and a coffee shop. In some embodiments, the content application determines that a comparison between the scene of the currently streamed video frame and a scene of the previously stored video frame indicates scene continuity. For example, a comparison between the scene of the currently streamed video frame occurring in the park and a scene of a previously stored video frame occurring in the same park indicates scene continuity because of the shared backdrop.

In some embodiments, the content application determines that the previously stored video frame is chronologically the earliest of the stored video frames that is similar to the currently streamed video frame. The content application may compare time segments assigned to each video frame to determine the chronological order of the frames and which frame is earlier than another. Replacing a currently streamed video frame with a similar video frame that occurred as long ago in time as possible relative to the currently streamed video frame has the benefit of providing a sense of progress in the video frames because the scenes are likely to look more different than scenes that occur closer in time.

To further promote nondisruptive video frame replacement that appears to the user as if the replacement video frame or set of video frames is in synchronization with the streamed audio, the content application may further base its replacement of the currently streamed video frame on the determination that the spoken dialogue associated with the currently streamed video frame is not associated with a person in the previously stored video frame. For example, the content application determines that the dialogue in the streamed audio that corresponds in time to the currently streamed video frame is spoken by a female actor. The content application identifies a previously stored video frame showing a male actor listening as being the video frame suitable for replacing the currently streamed video frame and being presented with the dialogue spoken by the female actor. Identifying a frame that does not share the same speaking actor has the benefit of synchronizing a replacement video frame with the streamed audio because there are no unsynchronized lip movements. For example, a set of video frames having the female actor either moving her lips in any way other than the way the viewer would recognize as being synchronized with the audio would also be disruptive to the content consumption experience.

The content application described herein may populate a video frame buffer to be accessed when streaming quality is reduced. In some embodiments, the content application receives the content item, using a data stream, for display. As the content item is received, the content application causes a predetermined number of video frames immediately preceding a streamed video frame to be stored in a video frame buffer. For example, the content receives the currently streamed video frame (e.g., the 3,000th video frame) of a content item and stores the last 500 video frames immediately preceding the currently streamed video frame (e.g., frames 2,500-2,999) in the video frame buffer. The content application compares the currently streamed video frame to each of the stored video frames in the video frame buffer. Based on this comparison, the content application identifies a frame of the stored video frames as being a similar video frame to the currently streamed video frame. In case the quality of streaming is reduced the next time the currently streamed video frame is presented after a currently streamed video frame is received, the identified frame from the frame buffer identified as being similar to the currently streamed video frame may be used in place of video frames that would otherwise have been streamed and displayed subsequent to the currently streamed video frame, had the quality of streaming been sufficient for the currently streamed video frame to avoid a buffering notification.

To compare the currently streamed video frame to each stored video frame in the video frame buffer, the content application may compare the scene of the currently streamed video frame to each respective scene of the stored video frames as described for determining that a previously stored video frame is similar to a currently streamed video frame. When populating the video frame buffer, the content application may determine the similar frame is chronologically the earliest of the stored frames. In some embodiments, as described for replacing the currently streamed video frame with the previously stored video frame based on the spoken dialogue associated with the currently streamed video frame, the content application determines the spoken dialogue associated with the currently streamed video frame and identifies the similar video frame by determining that the spoken dialogue is not associated with a person in the similar frame.

In some embodiments, sets of video frames in a content item are pre-curated for replacing video frames of the content when streaming quality is sufficiently reduced. The content item is divided into time segments where a time segment may contain one or more video frames such that any frame within that time segment is associated with a stored video set. The content application causes to be stored sets of video frames that are mapped to time segments of the content item. When the content application determines that the quality of streaming the video frames has reduced such that a synchronization between the video frames and the audio cannot be maintained, the content application may identify a set of video frames to display subsequent to the currently streamed video frame by identifying the set of video frames to which the time segment of the currently streamed video frame is mapped. The content application causes the stored set to be displayed while continuing to stream the audio, thereby avoiding buffering notifications that are more disruptive to the content consumption experience.

In some embodiments, the stored video sets are mapped to multiple time segments. The content application may receive metadata for identifying the mapping of the stored video sets to time segments of the content item. For example, metadata is used to identify that a stored video set is mapped to the video frames at a 9-minute mark of a television program. In some implementations, the metadata is received through the data stream through which the content item is received. In some embodiments, the metadata is pre-curated. The stored sets of video frames, the metadata, or both may be streamed prior to the content item being streamed to the device.

A reduction in network quality may last longer than the duration of any one mapped, stored video set. To avoid a buffering notification after the stored video set is played back, the content application may cause the stored video set or stored video frame to be repeatedly displayed until the streaming quality has sufficiently increased. In some embodiments, rather than repeating one stored video set, the content application identifies a second stored video set that is also mapped to the time segment at which the video frames are affected by reduced streaming quality and displays both the first and second stored video sets until the streaming quality has sufficiently increased.

When the quality of streaming a content item on a wireless network has improved, the content application may determine that the quality of streaming has sufficiently improved and cause the video frames of the content item to be displayed normally. Accordingly, the content application allows the user to, during reductions in the quality of streaming, view a content item without seeing obvious disruptions to the content consumption experience otherwise caused by buffering notifications.

It should be noted that the systems, methods, apparatuses, and/or aspects described above may be applied to, or used in accordance with other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts through and in which.

DETAILED DESCRIPTION OF THE DRAWINGS

Figure 1:
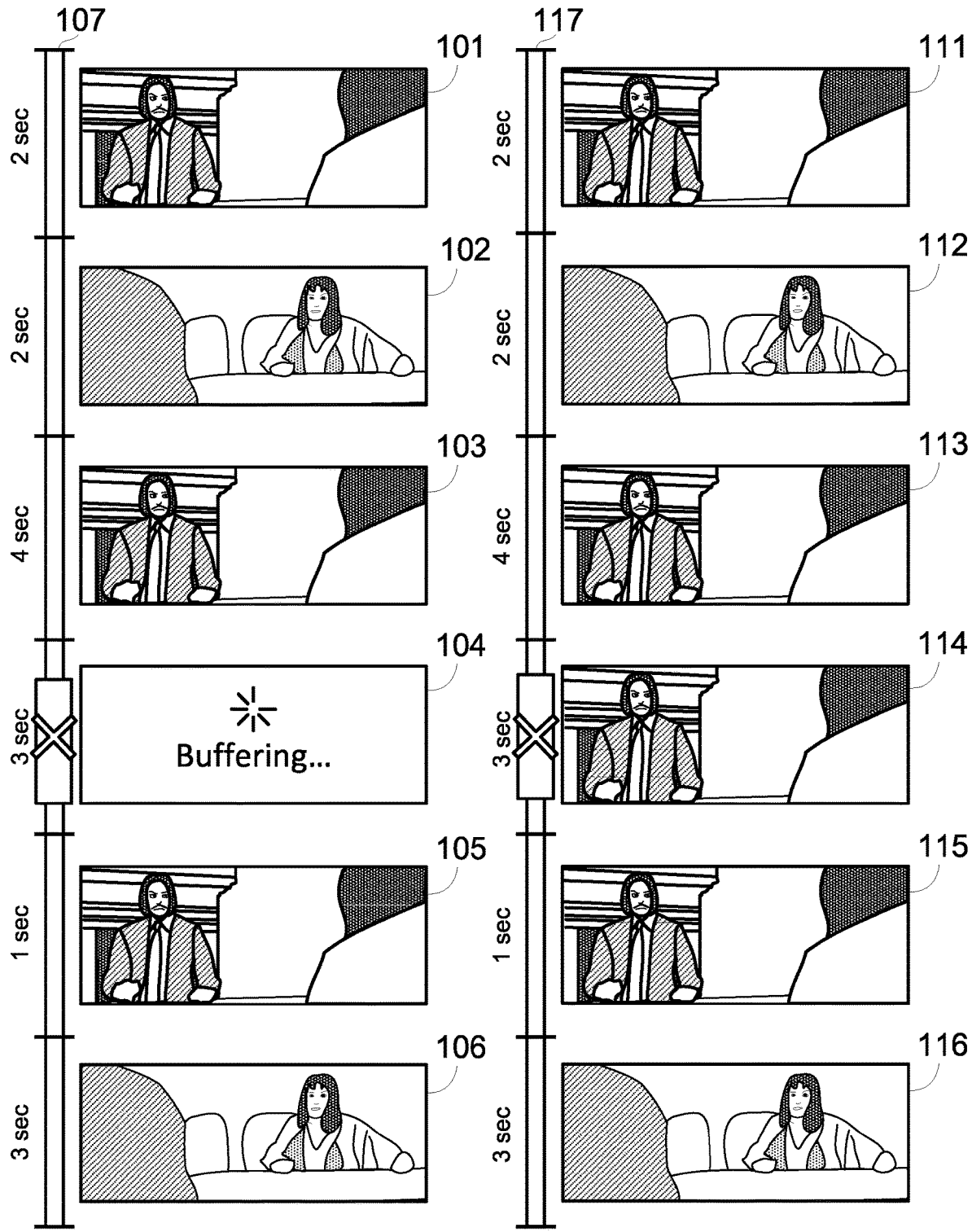
FIG. 1 shows an illustrative embodiment of providing content during streaming quality reduction, in accordance with at least some embodiments of the disclosure.

FIG. 1 shows an illustrative embodiment of providing content during streaming quality reduction, in accordance with at least some embodiments of the disclosure. A streamed content item affected by streaming quality reduction is shown through a timeline of camera angles, which are represented by video frames for ease of depiction. In one embodiment, shown through stream 107 and camera angles 101 through 106, a buffering notification is shown. The content application produces the content consumption experience depicted through stream 117 and camera angles 111 through 116. The process performed by the content application in the illustrative embodiment of FIG. 1 may be performed by hardware such as control circuitry and processing circuitry, as described in the descriptions of FIGS. 5-6.

In a scene of a content item where characters portrayed by a male and female actor are talking to each other, the camera records video at different angles depending on the camera placement at different locations. The video of the conversation shows the actors' mouths moving and their general body movements. In this scene, there is at least one angle depicting the male actor and at least one angle depicting the female actor. Streams 107 and 117 show a scene broken up by consecutive camera angles being presented at respective times in the course of presentation of the content item. Typically, a buffering message would be displayed when streaming quality is insufficient, as illustrated in stream 107. In some embodiments, as illustrated by stream 117, the content application provides alternative content in the place of the buffering message during times of insufficient quality. The alternative content can be, for example, one or more video frames from the video of the content item, itself. In some embodiments, the one or more video frames are selected based on the camera angle and what video frames and audio are presented at the camera angle. For example, the content application compares the video frame presented at a camera angle to other video frames of the content item to find a video frame of the same scene.

As illustrated, streaming quality reduction may occur during a scene where the characters are having a conversation. Stream 107 follows the chronological presentation of a content item through camera angles 101 through 106, including a buffering notification at camera angle 104 when the streaming quality reduction occurs. Stream 107 shows that the presentation of the content item will be at camera angle 101 for 2 seconds, camera angle 102 for 2 seconds, camera angle 103 for 4 seconds, camera angle 104 for 3 seconds, camera angle 105 for 1 second, and camera angle 106 for 3 seconds. During normal display of the content item (e.g., the content item is displayed with sufficient streaming quality), the camera angle between camera angles 103 and 105 depicts the female actor speaking from another angle. Due to a reduction in streaming quality, however, camera angle 104 of the female actor speaking is lost, and a buffering notification appears when the features of the present disclosure are not otherwise being used to provide alternative content during times of sufficiently reduced streaming quality. In some embodiments, the streaming of video frames of a content item is affected during periods of streaming quality reduction, while the streaming of audio is unaffected. Since a lower communication bandwidth is typically required for transmitting audio than is typically required for transmitting video, audio may be continuously received in a data stream between a transmitter of a content item and a device. Both the buffering notification and unsynchronized video are disruptive to the content consumption experience of a user.

When the content application is used to enhance the content consumption experience, the content application identifies a replacement video frame or set of video frames at a suitable angle to avoid showing buffering notifications when the quality of streaming is reduced. Stream 117 shows that the presentation of the content item will be at camera angle 111 for 2 seconds, camera angle 112 for 2 seconds, camera angle 113 for 4 seconds, camera angle 114 for 3 seconds, camera angle 115 for 1 second, and camera angle 116 for 3 seconds. FIG. 1 depicts the replacement video frames at camera angle 114 rather than the normally presented video frames. The content application provides camera angle 114 from the content item instead of causing a disruptive buffering notification to be displayed. Stream 117 depicts a similar chronological progression of camera angles as stream 107, but the content item identifies a suitable alternative camera angle to cause to be displayed when the quality of streaming is reduced during the display of camera angle 114.

In some embodiments, the content application replaces a currently streamed video frame with a previously stored video frame that the content application has determined to be similar to the currently streamed video frame. A content item is received for display. For example, the content application causes a movie to be received and displayed at a device using a data stream. The content item received using the data stream is provided with synchronized video frames and audio when the streaming quality is sufficient to maintain this synchronization. For example, although not shown, the normally presented video frames at camera angle 114 depict the female actor speaking, and the audio is a spoken dialogue of her voice. However, the streaming quality may be sufficiently reduced such that the data stream does not provide subsequent video frames of the female actor speaking and the audio of her voice continues to be presented with an unchanged or frozen video frame of the female actor.

As referred to herein, the terms "content item" and "media asset" should be understood to mean an electronically consumable user asset, such as television programming, as well as pay-per-view programs, on-demand programs, Internet content (e.g., streaming content, downloadable content, or Webcasts), video clips, audio, playlists, electronic books, social media, applications, games, any other media, or any combination thereof. Media content items may be recorded, played, displayed or accessed by devices. As referred to herein, "content providers" are digital repositories, conduits, or both of media content items. Content providers may include cable sources, over-the-top content providers, or other sources of content.

As referred to herein, a "device" should be understood to mean an electronic device capable of providing media content for consumption directly to a user. Devices include smartphones, tablets, virtual reality headsets, televisions, any other electronic device for content consumption, or any suitable combination thereof. As referred to herein, a "content application" includes any suitable software, hardware, or both for implementing the features described herein. The content application may be implemented either entirely or partially on a device such as user device 410 of FIG. 4. When implemented partially on device 410, the content application may be further partially implemented using any other suitable equipment located either locally to device 410 or remotely from device 410. The content application, in some embodiments, functions as a platform for content delivery on a device. In such embodiments, the content application is in either direct or indirect communication with one or more content providers using any suitable communication channels. As referred to herein, a "currently streamed video frame" describes a currently received or last received video frame when the streaming quality is sufficient to maintain a synchronization between streamed video frames and audio.

The content application may determine that the quality of streaming the received video frames of the content item has reduced such that a synchronization between the video frames and the audio cannot be maintained (i.e., the streaming quality has sufficiently reduced). In some embodiments, the content application determines that the bit rate of receiving the content item using the data stream has decreased to determine that the streaming quality has sufficiently reduced. For example, the content application determines that the bit rate at which the normally presented video frames of camera angle 114 are being received is 500 Mbps less than the bit rate at which the video frames of camera angle 113 were received. The content application may use a threshold to determine whether streaming quality has sufficiently increased or decreased. For example, the content application system qualifies a sufficient increase as an increase in bit rate greater than 50 Mbps and a sufficient decrease as a decrease in bit rate greater than 75 Mbps. In another example, the content application considers a sufficient increase in streaming quality as receiving the content item with a data stream having a rate of at least 500 Mbps and a sufficient decrease in streaming quality when the data stream has a speed that is lower than 500 Mbps.

The content application may determine the streaming quality has been sufficiently reduced by ways other than determining a sufficient decrease in bit rate. In some embodiments, the content application relies on user preferences to determine that the streaming quality is insufficient. For example, the content application receives user preferences indicating that the user requires high definition streaming quality, and when a movie cannot be streamed in high definition, the content application determines that the streaming quality has been sufficiently reduced. The user preferences may be directly input by the user, or the content application may determine user preferences based on analyzing user behavior. For example, the content application may determine that, on a home network, the user watches high definition content items more often than standard definition content and, based on this determination, the content application determines the user preference for high definition content on the home network. In some embodiments, the content application relies on performance parameters specific to the content item or content provider itself. For example, a content provider requires that a movie be streamed on a network connection having a minimum bit rate, response time (e.g., low latency), any suitable parameter of network performance, or any combination thereof.

In some embodiments, the content application determines that a previously stored video frame of the video frames received using the data stream is similar to a currently streamed video frame. For example, the content application determines that a previously stored video frame of camera angle 111 is similar to a currently streamed video frame of camera angle 114. In some embodiments, the content application stores previously received video frames of the content item. The replacement frame that is similar to the currently streamed video frame is selected from these previously received and stored frames. For example, the content application stores previously received video frames of camera angles 111-113 and selects the replacement video frame when streaming quality is sufficiently reduced from these stored video frames. The content application may compare the currently streamed video frames to the stored frames to determine that a previously stored video frame is similar to the currently streamed video frame. For example, the content application compares the currently streamed video frame of the female actor to the stored video frames of camera angles 111-113. In some embodiments, the content application determines that a comparison between the currently streamed video frame and a previously stored video frame indicates continuity of a scene. For example, the currently streamed video frame of the female actor has a backdrop of dark colors and depicts her sitting at a wooden table. A previously stored video frame that precedes the currently streamed video frame by 6 seconds of the male actor depicts him sitting at a wooden table with a dark-colored backdrop. The content application may, to determine scene continuity, compare the time difference between when video frames are streamed, compare the color gradient between the colors of consecutive video frames, use machine vision for identification of objects within a video frame, use any suitable image processing technique for object identification, or any combination thereof to determine scene continuity.

The video frame selected for replacement may be determined by the content application to increase the likelihood that a user will not notice that a reduction in streaming quality has caused the normally presented video frames and the audio to be out of synchronization. The content application may determine that a previously stored video frame is chronologically the earliest of the stored video frames that are similar to the currently streamed video frame. If video frames from both camera angles 111 and 113 are suitable for replacing a video frame at camera angle 114, the content application may choose a previously stored video frame of camera angle 111 because the use of camera angle 111 occurs chronologically earlier than the use of camera angle 113 occurs.

The content application may determine the spoken dialogue associated with the currently streamed video frame and that the spoken dialogue is not associated with a person depicted in a previously stored video frame. These determinations may also increase the likelihood that a user will not notice that the streamed audio is out of synchronization with the streamed video frames. For example, the normally presented video frames of camera angle 114 are normally presented in synchronization with audio of the female actor. The content application may determine that the spoken dialogue of the currently streamed video frame is associated with the female actor. In some embodiments, the content application further bases the replacement of the currently streaming video frame of the female actor on determining that her spoken dialogue is not associated with the male actor depicted in a previously stored video frame (e.g., video frames of camera angles 111 or 113).

In some embodiments, the content application populates a video frame buffer in preparation for replacing video frames. The video frame buffer is a storage for video frames as a content item is being streamed to a device for display. In some embodiments, the content application populates the video frame buffer and identifies replacement video frames prior to a reduction in streaming quality. For example, as a user is watching a movie streamed to his device, the content application stores a predetermined number of immediately preceding video frames to a currently streamed video frame and compares the stored video frames to the currently streamed video frame to identify a similar video frame that is suitable for replacing the currently streamed video frame in the event that a reduction in streaming quality causes the received video frames and audio to become out of synchronization at the currently streamed video frame.

In some embodiments, the content application receives the content item using a data stream. For example, a movie is transmitted to the content application on a device through a Wi-Fi network. Wi-Fi is a trademark owned by the Wi-Fi Alliance. The content application may cause a predetermined number of immediately preceding streamed video frames of the content item to be stored in a video frame buffer. For example, the content application currently receiving the 3,000th video frame for streaming stores the last 500 video frames immediately preceding the 3,000th video frame (e.g., frames 2,500-2,999) in the video frame buffer. The content application currently streaming a video frame of camera angle 114 may store video frames from camera angles 111-113 into the video frame buffer. The predetermined number of video frames stored may be determined based on user preference, device storage capacity, content provider restrictions, network bandwidth limitations, scene delineations, or any suitable combination thereof. For example, the content application may analyze the video frames of the received content item to determine that there is scene continuity or a change in scene. The content application may use any suitable form of image processing, audio processing, or a combination thereof to recognize objects (e.g., people, voices, inanimate objects, and scenery) that carry through multiple video frames comprising a scene. Once changes in the recognized objects cross a threshold, the content application may determine that one scene has ended and another has begun. In some embodiments, the content application receives metadata of the scene delineations, various camera angles in a scene, and where the camera angles start and end. For example, the content application may determine, from scene metadata, that camera angle 111 begins at 20:00, or twenty minutes from the beginning of the movie.

In some embodiments, the content application compares the currently streamed video frame to each stored video frame in the video frame buffer. The content application may compare any identifying quality of the respective video frames, including the contents of the video frames (e.g., the pixels that make up the images and their corresponding bit maps), time at which the video frames were received, the audio associated with the video frames, any suitable characteristic of a video frame, or any combination thereof. For example, the content application determines that a stored video frame of camera angle 111 in the video frame buffer is similar to a currently streamed video frame of camera angle 114. In some embodiments, the content application stores previously received video frames of the content item. The replacement frame that is similar to the currently streamed video frame is selected from these previously received and stored frames. For example, the content application stores previously received video frames of camera angles 111-113 and selects the replacement video frame when streaming quality is sufficiently reduced from these stored video frames. The content application may compare the currently streamed video frames to the stored frames to determine that a previously stored video frame is similar to the currently streamed video frame. For example, the content application compares the currently streamed video frame of the female actor to the stored video frames of camera angles 111-113. In some embodiments, the content application determines that a comparison between the currently streamed video frame and a previously stored video frame indicates scene continuity. For example, the currently streamed video frame of the female actor has a backdrop of dark colors and depicts her sitting at a wooden table. A previously stored video frame that precedes the currently streamed video frame by 6 seconds of the male actor depicts him sitting at a wooden table with a dark-colored backdrop. The content application may, to determine scene continuity, compare the time difference between when video frames are streamed, compare the color gradient between the colors of consecutive video frames, use machine vision for identification of objects within a video frame, use any suitable image processing technique for object identification, or any combination thereof to determine scene continuity.

To decrease the likelihood that a user notices that a reduction in streaming quality has caused the normally presented video frames and the audio to be out of synchronization, the content application may determine that, of the stored video frames that are similar to the currently streamed video frame, the replacement video frame is chronologically the earliest. If video frames from both camera angles 111 and 113 are suitable for replacing a video frame at camera angle 114, the content application may choose a previously stored video frame of camera angle 111 because the use of camera angle 111 occurs chronologically earlier than the use of camera angle 113 occurs.

The content application may determine the spoken dialogue associated with the currently streamed video frame and that the spoken dialogue is not associated with a person depicted in a previously stored video frame. For example, the content application determines that the spoken dialogue of the streamed audio is of the female actor and the replacement frame is chosen such that an actor presented in the frame is not the female actor. For this reason, the content application may identify video frames of either camera angles 111 or 113 that depict the male actor to be suitable for replacing the currently streamed video frame of the woman talking.

In some embodiments, the content application provides replacing a streamed video frame that has become out of synchronization with the streamed audio with a set of video frames. Sets of video frames of a content item may have been pre-mapped or pre-curated to be similar to video frames such that they are suitable substitutes when a video frame becomes out of synchronization during reduced streaming quality. In some embodiments, the content application causes at least one set of the video frames of the content item to be stored. The stored video frames are used by the content application to replace video frames being affected by a reduced streaming quality. For example, the video frames of camera angle 111 and camera angle 113 are stored by the content application in the local memory of a device (e.g., a smartphone). The stored video frames are also mapped to video frames occurring at respective time segments of the content item. For example, the stored video frames of camera angle 111 and camera angle 113 are mapped to the video frames associated with the content item normally presented at camera angle 114 (e.g., video of the female actor speaking).

The content application may receive the content item using a data stream. For example, the content application may receive the content item (e.g., a movie) using a data stream over a Wi-Fi network. The quality of the data stream or the quality of streaming depends on factors such as the number of devices within the network consuming the limited network bandwidth at once and the maximum bandwidth that is predetermined by an Internet provider. The received content item is divided into time segments. Each of the time segments corresponds to a respective video frame of the content item and to at least one stored set of the video frames. For example, the movie is represented as a chronological series of video frames and time segments that are tagged to at least one of the video frames. In some embodiments, a time segment corresponding to a video frame is mapped to at least one set of video frames. For example, video frames of camera angle 111 and camera angle 113 are mapped to the time segment of 20:09 or 20 minutes and 9 seconds from the start of the movie. The time segment of 20:09 corresponds to a video frame of normally presented camera angle 114.

The content application may determine that a quality of streaming the video frames has reduced during the streaming of one of the time segments. Streaming quality may be considered reduced when the bit rate of the data stream is lowered, including a bit rate of 0 Mbps (e.g., the device is disconnected from the network). In some embodiments, the content application determines that the bit rate of receiving the content item using the data stream has decreased. The content application may use any suitable threshold as described herein for determining that the bit rate of receiving the content item has decreased.

When the quality of streaming the video frames has reduced, the content application may use the mapping between each time segment and at least one corresponding set of video frames to identify suitable camera angles to replace video frames affected by the reduced streaming quality. For example, the content application uses the time stamp of 20:09 corresponding to a video frame of normally presented camera angle 114 to identify that the stored video frames at camera angles 111 and 113 are suitable for replacing the video frame at 20:09.

In some embodiments, the content application receives metadata in the data stream, where the identification of the suitable camera angles is based on the metadata. For example, the metadata includes a data structure that holds key-value pairs of time segment keys and video frames identifiers of the suitable camera angle values. The mapping of time segments to video frames is described further in the description of FIG. 3. The metadata including the mapping for each time segment of the content item may be received prior to receiving the content item such that the content application has complete, a priori knowledge of the mapping in the case of any reduction in streaming quality. The metadata may be packaged such that it is received at once, which will be described in the description of FIG. 2.

Once the content application identifies the set of video frames corresponding to the time segment affected by the reduction of streaming quality, the content application may cause the identified set to be displayed in place of streaming the video frames while continuing to stream the audio of the content item. For example, the content application displays the replacement video frames from camera angle 111 depicting the male actor listening in place of normally presented camera angle 114 while continuing to stream the spoken dialogue of the female actor. In this way, the content application has enhanced the content consumption experience by showing a previously stored video frame suitable for presentation with the streamed audio without resorting to a buffering notification.

When the duration of the reduction in quality is greater than the duration of any one set of video frames that are mapped to a time segment, the content application may implement one of multiple workarounds. In some embodiments, the content application causes the identified set to be repeatedly displayed until the streaming quality has sufficiently increased. For example, if the reduction in streaming quality lasts the entire 3-second duration of camera angle 114, the 2-second duration of camera angle 111 will not fully replace the absence of the normally presented video frames. The content application may cause the video frames lasting 2 seconds to be displayed 1.5 times to fill the 3 seconds of video loss (i.e., display the 2 seconds of video frames immediately followed by displaying the first second of the 2 seconds of video). In some embodiments, the content application identifies multiple sets of the stored sets of video frames as suitable to replace a time segment affected by the reduced streaming quality. The content application may then use the multiple identified sets through the duration of the reduced streaming quality. For example, the content application identifies the sets of video frames at camera angles 111 and 113 as corresponding to the time segment associated with camera angle 114. The content application may then display video frames from both camera angles in place of the normally streaming video frames of camera angle 114. In some embodiments, the content application determines the order in which multiple sets are displayed when replacing video frames affected by reduced streaming quality. The content application may choose the order of sets based on their length. For example, video frames associated with camera angle 113 may be displayed before the video frames associated with camera angle 111 because the video frames associated with camera angle 113 have a longer duration than the video frames associated with camera angle 111. The content application may choose the order of sets based on the chronological occurrence of the sets in the content item. For example, the content application chooses to display video frames associated with camera angle 111 before the video frames associated with camera angle 113 because camera angle 111 was presented earlier than camera angle 113.

In some embodiments, the content application causes the video frames of the content item to be displayed as they normally would be after determining the quality of streaming the video frames has sufficiently increased. For example, the content application determines that the bit rate of the data stream used to receive the content item is now above a 500 Mbps threshold and causes the video frames at camera angle 115 of the content item to be displayed instead of using stored video frames for replacement. When the content application determines that the received video frames are synchronized with the audio (e.g., the video frames have been consistently received and buffered while synchronized with the audio for a period of time), the content application may cause the received video frame stream to be displayed once again, picking up at a time corresponding to the progress of the audio stream. For example, the bit rate of the data stream providing the movie in FIG. 1 sufficiently increases such that the content application begins to receive the video frames that are synchronized with the received audio. The content application may, before displaying the synchronized video frames, monitor the quality of the data stream and the synchronization of the video frames and audio for some period of time (e.g., 2 seconds). If the received video frames and audio are synchronized for those 2 seconds, the content application may cause the normally presented video frames and audio to be displayed (e.g., continuing normal display of camera angle 115).

In some embodiments, the content application may cause stored sets of video frames to be deleted after determining that the stored sets of video frames are not mapped to any upcoming time segment. For example, the scene of the male and female actors having a conversation as depicted in FIG. 1 ends after camera angle 116, and the stored sets of video frames corresponding to the scene are not mapped to future time segments of the movie. The content application may compare the time segment associated with a currently streamed video segment after camera angle 116, determine that the stored sets of video frames of camera angles 111-113 are mapped only to time segments preceding the time segment associated with the currently streamed video segment, and cause the stored sets of video frames of camera angles 111-113 to be deleted from the memory of the device. If a device has limited storage capacity, the content application may cause a portion of the entire collection of replacement video frame sets to be stored and download another portion only after deleting stored portions from the device's storage.

Figure 2:
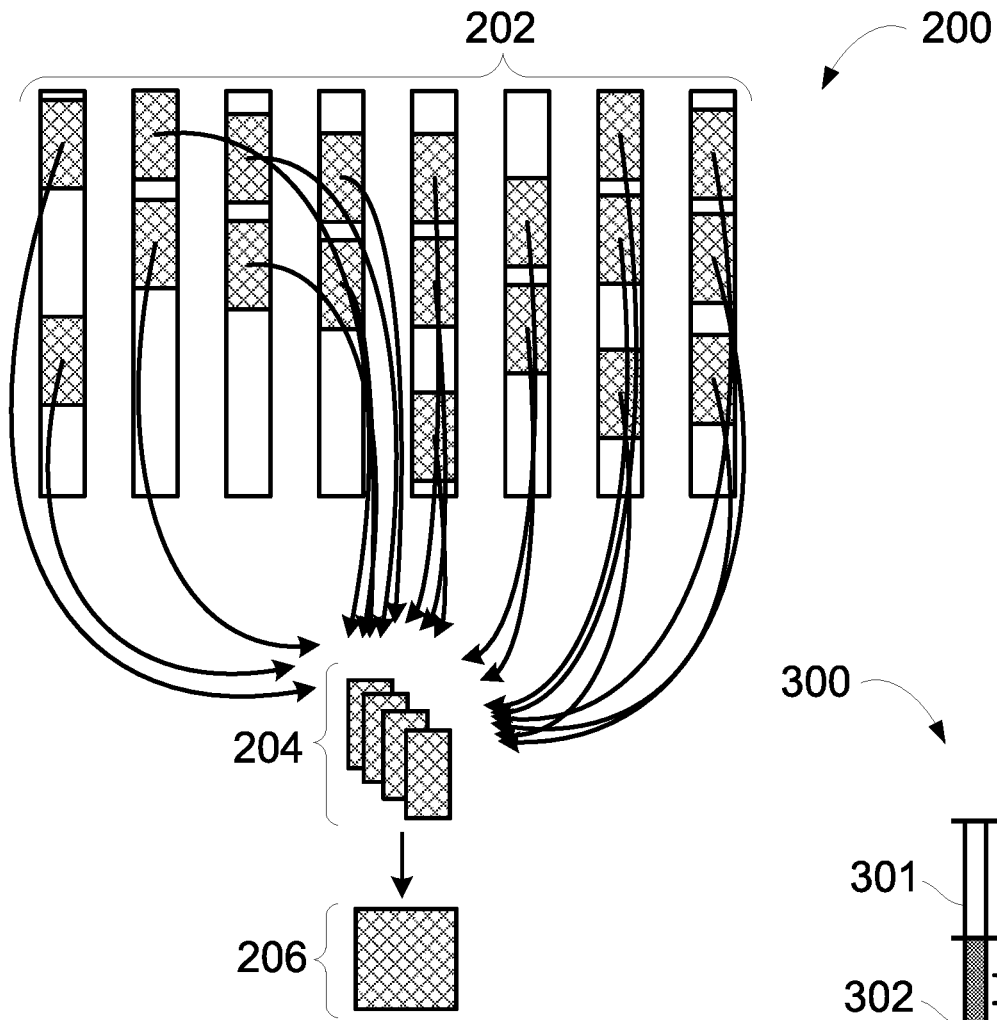
FIG. 2 shows a diagram of an illustrative example of packaging metadata for mapping video frame sets, in accordance with at least some embodiments of the disclosure.

FIG. 2 shows diagram 200 of an illustrative example of packaging metadata for mapping video frame sets, in accordance with at least some embodiments of the disclosure. Sets of video frames 202 of a content item include identified scenes that are mapped to other video frames in the content item. In some embodiments, the content application causes the sets of video frames 202 to be downloaded to a device before a content item is streamed to the device. Pre-downloading the sets of video frames to replace video frames affected by streaming quality reduction has the benefit of providing replacement video frames at the very beginning of a scene before a content application could otherwise store and identify replacement video frames in real time. The process performed by the content application in the illustrative example of packaging metadata for mapping video frame sets of FIG. 2 may be performed by hardware such as control circuitry and processing circuitry, as described in the descriptions of FIGS. 5-6.

In some embodiments, the content application processes the content before causing the content item to be displayed or streamed to a device for display (e.g., pre-processing). The content application may identify the replacement sets of video frames for each scene of the content item. For example, for a movie filmed inside different rooms of a house, where each scene is identifiable by the room in which it is filmed, the content application identifies replacement sets of video frames for each room and actor in the room. In some embodiments, the content application selects replacement video frames by determining which scenes depict an actor who is either silent or making minimal lip movements. This selection may help the streamed audio played with the replacement video frames seem as if it is still synchronized with the replacement video because there is no mismatched spoken dialogue and lip movement. In some embodiments, the content application determines, using audio processing, video frames that are accompanied by audio of the actor who is performing the spoken dialogue of a video frame under analysis. The content application may then use image processing to determine which of these video frames do not depict this actor. For example, the content application may perform audio processing on the audio of normally presented camera angles 111-116 to determine that the female actor is speaking throughout the camera angles. Because the content application has determined that the camera angles belong to the same scene and the spoken dialogue is associated with her voice, the content application selects, from the normally presented video frames of those camera angles, video frames in which the male actor is making minimal lip movements.

In some embodiments, the sets of video frames are chosen by the content application during pre-processing such that the set of consecutive video frames having the longest duration is mapped. For example, a first set of video frames having a duration of 4 seconds may be chosen for mapping over a second set of video frames having a duration of 2 seconds. In some embodiments, the content application selects multiple sets of video frames for each scene or each video frame in a scene. For example, the content application may choose a first set of video frames with the male actor directly facing the camera and a second set of video frames with a side view of the female actor that obscures her lip movements as two sets of suitable replacement candidates for a video frame associated with the spoken dialogue of the female actor.

The chosen replacement sets of video frames 204 may be packaged into package 206 and stored as part of the metadata of the content. In some embodiments, replacement sets of video frames 204 are identifiable by time segment tags, scene number, any suitable identification mark to map a set of video frames to at least one other video frame, or any combination thereof. For example, the content application creates a data structure or pointer linking data of the replacement set of video frames associated with camera angle 111 to time segment 20:09 associated with a video frame at camera angle 114. In some embodiments, the content application causes package 206 to be received by the device or receives the package 206 before the content item is streamed. The content application may cause package 206 to be received by the device when the network bandwidth is high enough for package 206 to be transmitted or when the device has sufficient storage capacity to download package 206. In some embodiments, the content application may cause portions of package 206 to be received by the device and cause other portions of package 206 to be received when the network bandwidth or storage capacity is sufficient.

Figure 3:
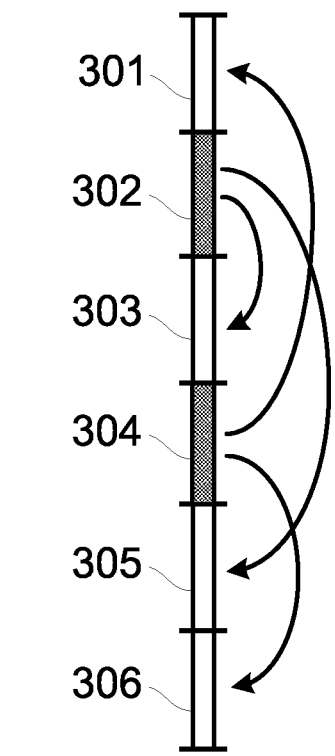
FIG. 3 shows a diagram of an illustrative example of mapping time segments and video frames, in accordance with at least some embodiments of the disclosure.

FIG. 3 shows diagram 300 of an illustrative example of mapping time segments and video frames, in accordance with at least some embodiments of the disclosure. The content application may perform mapping, or pre-mapping if the mapping is done prior to the content item being streamed to a device, to identify a video frame or video frames to replace a video frame affected by reduced streaming quality. A content item is divided into camera angles including camera angles 301-306. Camera angles 302 and 304 have been determined by the content application to be suitable for replacing video frames associated with camera angles 301, 303, 305, and 306. In some embodiments, the content application may package the sets of replacement video frames at camera angles 302 and 304 into a package (e.g., package 206) to be available for download by a device before the content item is streamed. The process performed by the content application in the illustrative example of mapping time segments and video frames of FIG. 3 may be performed by hardware such as control circuitry and processing circuitry, as described in the descriptions of FIGS. 5-6.

Figure 4:
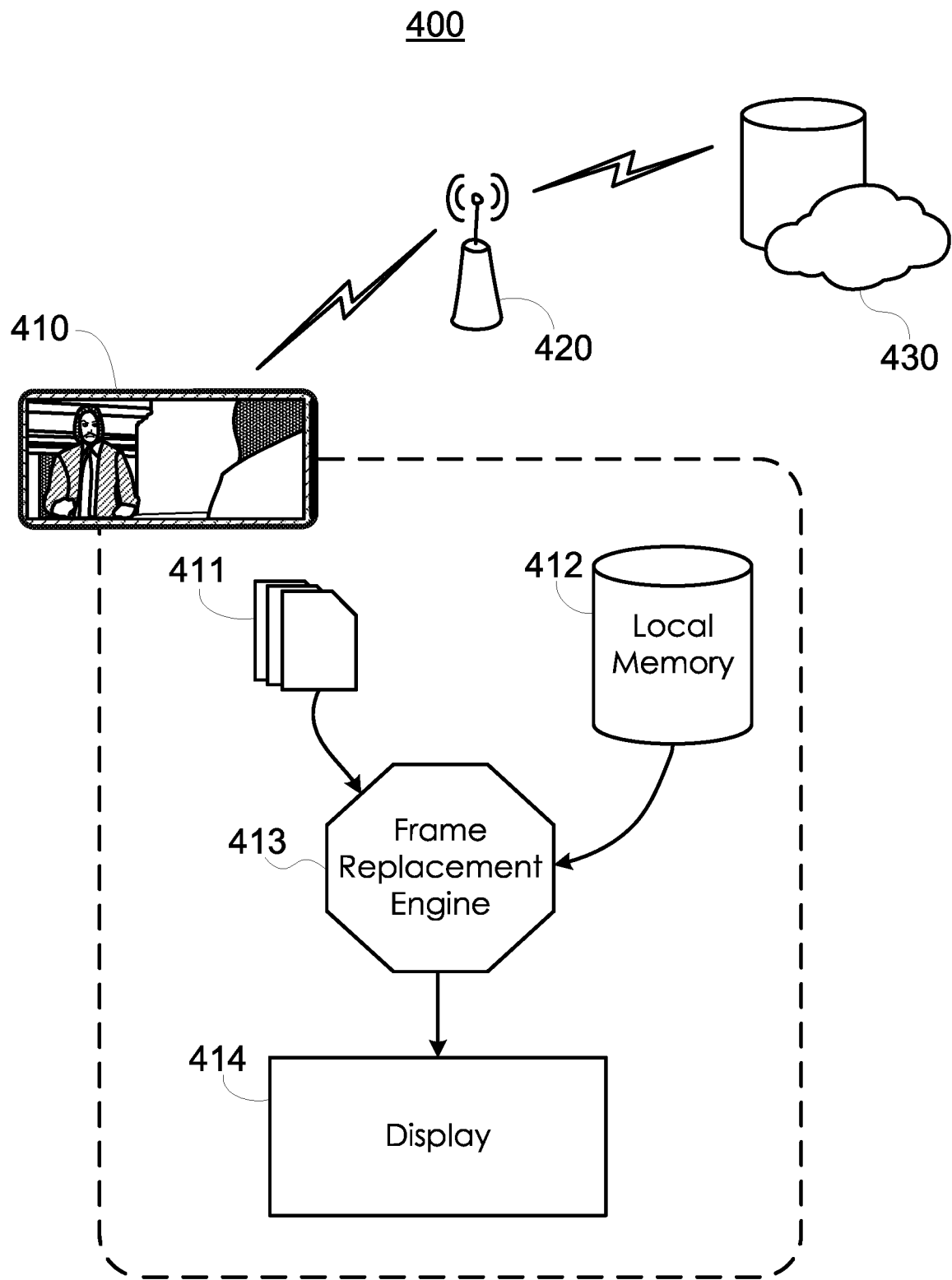
FIG. 4 shows a diagram of an illustrative system for providing content during streaming quality reduction, in accordance with at least some embodiments of the disclosure.

FIG. 4 shows diagram 400 of an illustrative system for providing content during streaming quality reduction, in accordance with at least some embodiments of the disclosure. Device 410 and content source 430 are communicatively linked through network communication node 420. For example, a mobile phone may be linked to the content source of a streaming service such as Netflix over a communication network enabled by a Wi-Fi router. Device 410 includes local memory 412, display 414, and control circuitry (e.g., control circuitry 504 of FIG. 5). The control circuitry further includes frame replacement engine 413 for processing received content item data 411. Content item data 411 may include video frames, audio, and packaged metadata to be used by frame replacement engine 413 to replace video frames affected by streaming quality reductions with a suitable video frame or frames. Although depicted as separate from local memory 412, content item data 411 may be stored within local memory 412. For example, the packaged metadata or video frames used for the video frame buffer may be stored in local memory 412.

The control circuitry or the frame replacement engine 413 associated with the control circuitry may perform any one portion or the entirety of the replacement and buffer-populating processes described in the description of FIG. 1. For example, frame replacement engine 413 causes the video frames and audio of content item data 411 to be received by device 410, determines that the streaming quality has reduced such that the video frames and audio are not synchronized (e.g., the bit rate transmitted by communication node 420 is sufficiently decreased), and determines a replacement video frame stored in local memory 412 to be displayed on display 414.

To determine the replacement video frame, frame replacement engine 413 may compare a currently streamed video frame of content item data 411 to a video frame that is previously stored in local memory 412. Local memory 412 may store a suitable number of video frames based upon the size of its storage capacity. For example, a device having 2 gigabytes of storage available stores approximately two 90-minute movies (i.e., 1 GB per movie) which is approximately equivalent to 129,600 video frames. Frame replacement engine 413 may populate a video frame buffer. For example, frame replacement engine 413 stores a predetermined number of video frames preceding a currently streamed video frame in a video frame buffer of local memory 412. In some embodiments, frame replacement engine 413 determines, using metadata in content item data 411, a set of video frames to replace a currently streamed video frame. Frame replacement engine 413 may then cause the replacement set of video frames to be displayed in display 414.

Figure 5:
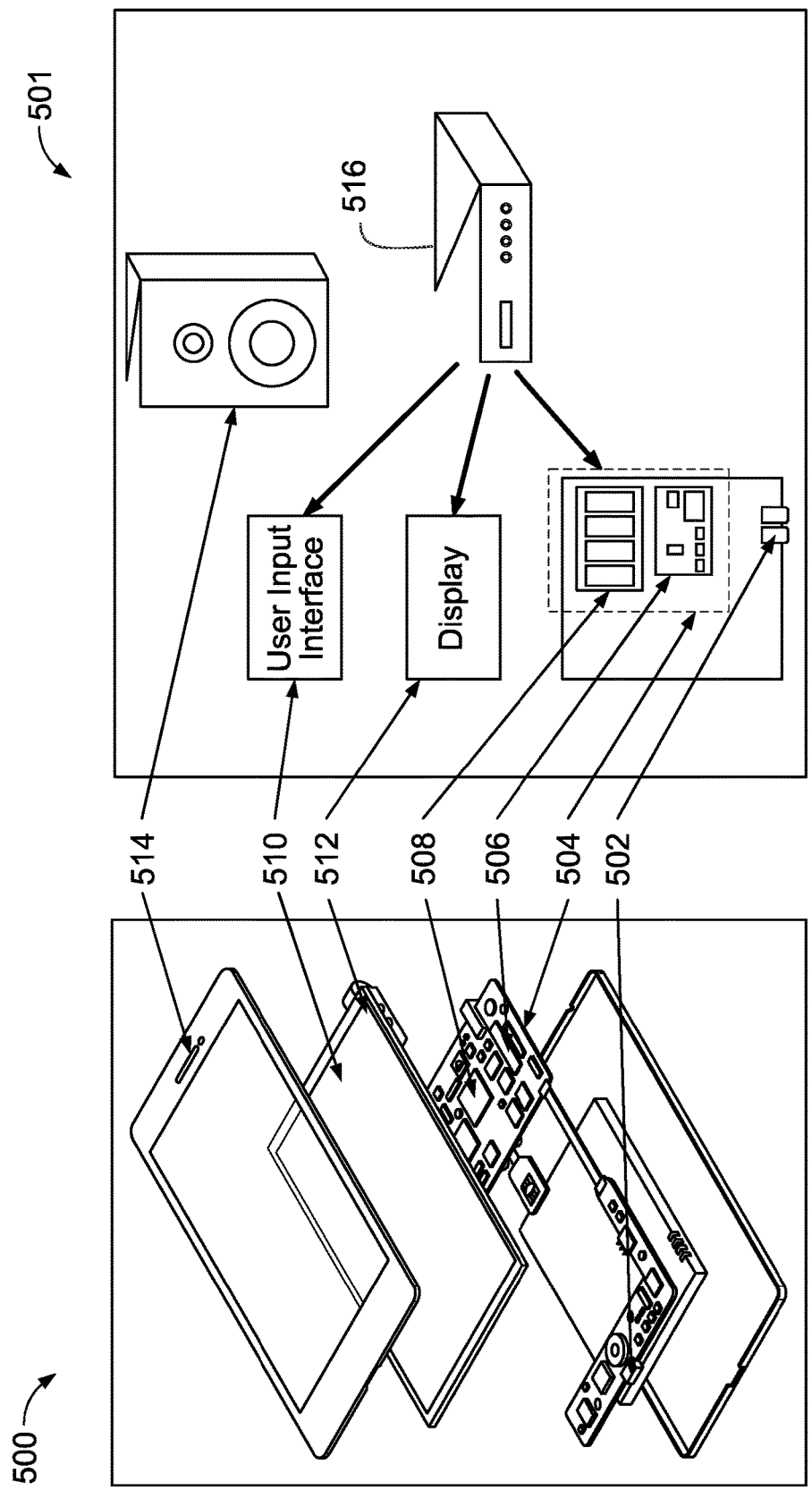
FIG. 5 shows a block diagram of an illustrative device, in accordance with at least some embodiments of the disclosure.

Users may access content from one or more of their devices. FIG. 5 shows generalized embodiments of a device capable of presenting content on a display 512. For example, display 512 may belong to a smartphone device. In another example, display 512 may belong to a user television equipment system. User television equipment system with display 512 may include a set-top box 516. Set-top box 516 may be communicatively connected to speaker 514, and display 512. In some embodiments, display 512 may be a television display or a computer display. In some embodiments, set top box 516 may be communicatively connected to user interface input 510. In some embodiments, user interface input 510 may be a remote-control device. Set-top box 516 may include one or more circuit boards. In some embodiments, the circuit boards may include processing circuitry, control circuitry, and storage (e.g., RAM, ROM, Hard Disk, or Removable Disk). In some embodiments, circuit boards may include an input/output path. More specific implementations of devices are discussed below in connection with FIG. 6. Each one of device 500 and user equipment system 501 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for an application stored in memory (e.g., storage 508). Specifically, control circuitry 504 may be instructed by the application to perform the functions discussed above and below. For example, the application may provide instructions to control circuitry 504 to determine a video frame or set of video frames for replacement of a currently streamed video frame affected by a reduction in streaming quality. In some implementations, any action performed by control circuitry 504 may be based on instructions received from the application.

In client-server based embodiments, control circuitry 504 may include communications circuitry suitable for communicating with a content application server or other networks or servers. The instructions for carrying out the above-mentioned functionality may be stored on the content application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of devices, or communication of devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein, including, for example, a content item that is streamed to a device, sets of video frames that are identified as suitable replacements for corresponding video frames, metadata containing mappings of time segments to sets of video frames, and identifiers for scene start and end points. Nonvolatile memory may also be used (e.g., to launch a boot-up routine and other instructions). Cloud-based storage, described in relation to FIG. 6, may be used to supplement storage 508 or instead of storage 508. In some embodiments, a database is accessible at the cloud-based storage, where the database stores a content item that is streamed to a device, sets of video frames that are identified as suitable replacements for corresponding video frames, metadata containing mappings of time segments to sets of video frames, and identifiers for scene start and end points. Nonvolatile memory may also be used (e.g., to launch a boot-up routine and other instructions).

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive content data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, or multiple-tuner recording). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of device 500 and user equipment system 501. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of each one of device 500 and user equipment system 501 or may be stand-alone units. The audio component of videos and other content displayed on display 512 may be played through speakers 514. In some embodiments, the audio may be distributed to a receiver (not shown), which processes and outputs the audio via speakers 514.

The content application may be implemented using any suitable architecture. For example, it may be a stand-alone application wholly-implemented on each one of device 500 and user equipment system 501. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510.

In some embodiments, the application is a client-server based application. Data for use by a thick or thin client implemented on each one of device 500 and user equipment system 501 is retrieved on-demand by issuing requests to a server remote to each one of device 500 and user equipment system 501. In one example of a client-server based content application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500.

In some embodiments, the content application is downloaded and interpreted or otherwise run by an interpreter or virtual machine (run by control circuitry 504). In some embodiments, the content application may be encoded in the ETV Binary Interchange Format (EBIF), received by control circuitry 504 as part of a suitable feed, and interpreted by a user agent running on control circuitry 504. For example, the content application may be an EBIF application. In some embodiments, the content application may be defined by a series of JAVA-based files that are received and run by a local virtual machine or other suitable middleware executed by control circuitry 504. In some of such embodiments (e.g., those employing MPEG-2 or other digital media encoding schemes), the content application may be, for example, encoded and transmitted in an MPEG-2 object carousel with the MPEG audio and video packets of a program.

Figure 6:
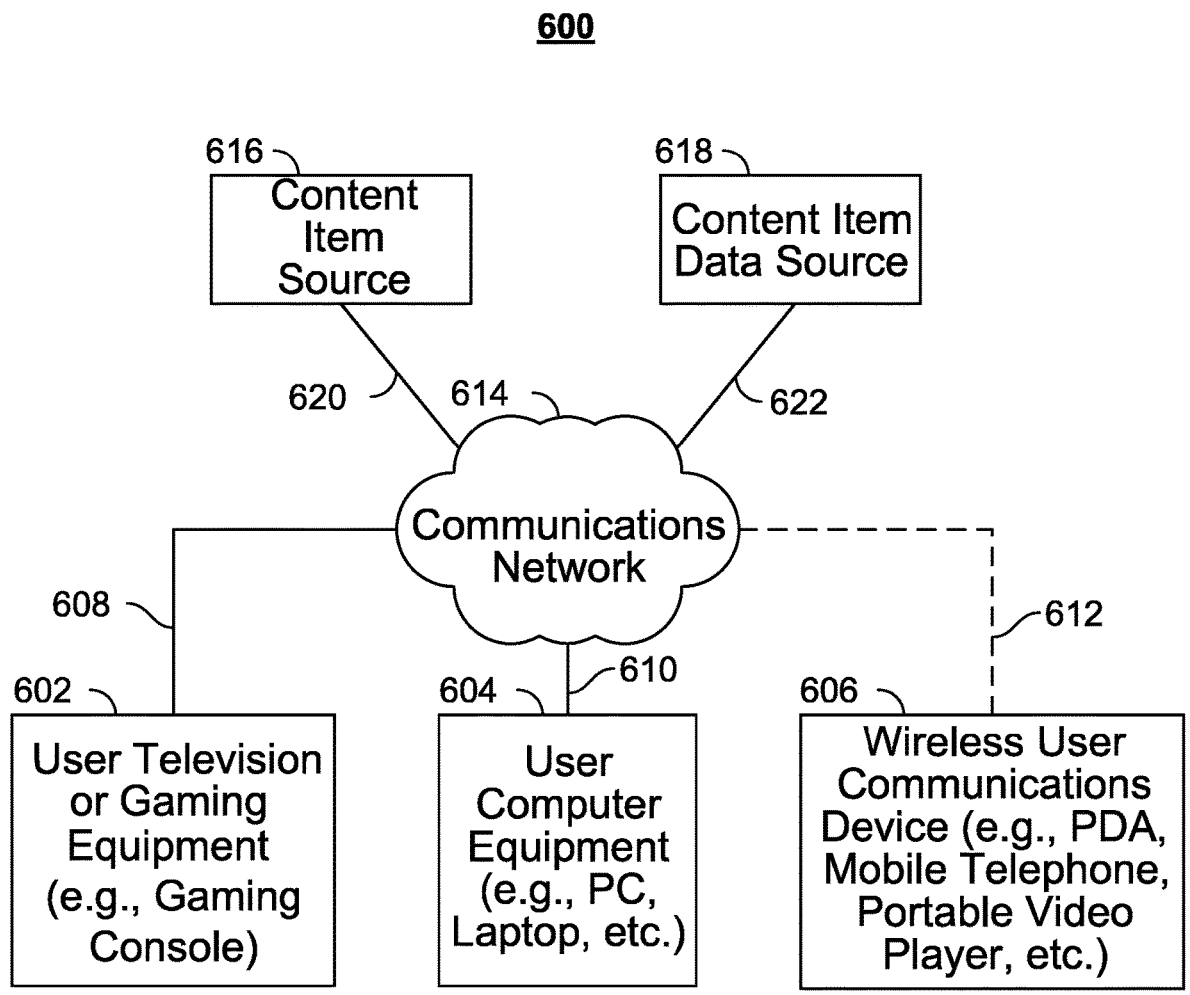
FIG. 6 shows a block diagram of an illustrative content output system, in accordance with at least some embodiments of the disclosure.

Each one of device 410 and user equipment system 501 of FIG. 5 may be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or devices and may be substantially similar to devices described above. Devices, on which an application may be implemented, may function as a standalone device or may be part of a network of devices. Various network configurations of devices may be implemented and are discussed in more detail below.

A device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The application may have the same layout on various different types of user equipment or may be tailored to the display capabilities of the user equipment. For example, on user computer equipment 604, the content application may be provided as a web site accessed by a web browser. In another example, the content application may be scaled down for wireless user communications devices 606.

In system 600, there is typically more than one of each type of device but only one of each is shown in FIG. 6 to avoid overcomplicating the drawing. In addition, each user may utilize more than one type of device and also more than one of each type of device.

In some embodiments, a device (e.g., user television equipment 602, user computer equipment 604, wireless user communications device 606) may be referred to as a "second device." For example, a second device may provide an interface for adjusting settings and display preferences of the first device. In some embodiments, the second device is configured for interacting with other second devices or for interacting with a social network. The second screen device may be located in the same room as the first device, a different room from the first device but in the same house or building, or in a different building from the first device.

The user may also set various settings to maintain consistent application settings across in-home devices and remote devices. For example, if a user enables replacement of video frames during reduction of streaming quality on their personal computer at their office, this feature would also be enabled on the user's in-home devices (e.g., user television equipment and user computer equipment) as well as the user's mobile devices, if desired. Therefore, changes made on one device may change the content experienced on another device, regardless of whether they are the same or a different type of device. In addition, the changes made may be based on settings input by a user, as well as user activity monitored by the content application. In addition, two devices may work together to provide functionality for the user. For example, the first device performing comparison of the currently streamed video frame to previously stored video frames may further instruct the second device to display a previously stored video frame that the first device has identified as a suitable replacement video frame.

The devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the devices may be provided by one or more of these communications paths but are shown as a single path in FIG. 6 to avoid overcomplicating the drawing.

Although communications paths are not drawn between devices, these devices may communicate directly with each other via communications paths, such as those described above in connection with paths 608, 610, and 612, as well as other short-range point-to-point communications paths, such as USB cables, IEEE 1394 cables, wireless paths (e.g., Bluetooth, infrared, or IEEE 602-11x), or other short-range communication via wired or wireless paths. BLUETOOTH is a certification mark owned by Bluetooth SIG, INC. The devices may also communicate with each other directly through an indirect path via communications network 614.

System 600 includes content source 616 and content data source 618 coupled to communications network 614 via communications paths 620 and 622, respectively. Paths 620 and 622 may include any of the communications paths described above in connection with paths 608, 610, and 612. Communications with the content source 616 and content data source 618 may be exchanged over one or more communications paths but are shown as a single path in FIG. 6 to avoid overcomplicating the drawing. In addition, there may be more than one of each of content source 616 and content data source 618, but only one of each is shown in FIG. 6 to avoid overcomplicating the drawing. If desired, content source 616 and content data source 618 may be integrated as one source device. Although communications between sources 616 and 618 with devices 602, 604, and 606 are shown as through communications network 614, in some embodiments, sources 616 and 618 may communicate directly with devices 602, 604, and 606 via communications paths (not shown) such as those described above in connection with paths 608, 610, and 612.

Content source 616 may include one or more types of content distribution equipment including a television distribution facility, cable system headend, satellite distribution facility, programming sources (e.g., television broadcasters), intermediate distribution facilities and/or servers, Internet providers, on-demand content servers, and other content providers. Content source 616 may be the originator of content (e.g., a television broadcaster or a Webcast provider) or may not be the originator of content (e.g., an on-demand content provider or an Internet provider of content of broadcast programs for downloading). Content source 616 may include cable sources, satellite providers, on-demand providers, Internet providers, over-the-top content providers, or other providers of content. Content source 616 may also include a remote content server used to store different types of content (including video content selected by a user), in a location remote from any of the devices. Content source 616 may include at least 2 sources for content that provide content for the content application to provide on the user devices (e.g., user devices 102 and 202). Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content data source 618 may provide data related to the content. Content data may be provided to the devices using any suitable approach. In some embodiments, the content application may be a stand-alone interactive television program guide that receives program guide data via a data feed (e.g., a continuous feed or trickle feed). Program schedule data and other content data may be provided to the user equipment on a television channel sideband, using an in-band digital signal, using an out-of-band digital signal, or by any other suitable data transmission technique. Program schedule data and other content data may be provided to user equipment on multiple analog or digital television channels.

In some embodiments, content data from content data source 618 may be provided to user's equipment using a client-server approach. For example, a user equipment device may pull content data from a server, or a server may push content data to a user equipment device. In some embodiments, a content application client residing on the user's equipment may initiate sessions with source 618 to obtain content data when needed, e.g., when the content data is out of date or when the device requests the data. Content data may be provided to the user equipment with any suitable frequency (e.g., continuously, daily, a user-specified period of time, a system-specified period of time, or in response to a request from user equipment). Content data source 618 may provide devices 602, 604, and 606 the application itself or software updates for the application.

In some embodiments, the content data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, or brain activity information). The content data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of less or more than one year. The content data may include a model (e.g., a survivor model) used for generating a score that indicates a likelihood a given user will terminate access to a service/source. For example, the application may monitor a user's engagement with content to generate a value or score that indicates a likelihood of whether the given user will terminate access to a particular service or source. In particular, a higher score may indicate a higher level of confidence that the user will terminate access to a particular service or source. Based on the score, the application may generate promotions that entice the user to keep the particular service or source indicated by the score as one to which the user will likely terminate access. The content data may include metadata files pertaining to the content or content segments (e.g., characteristics of content portions, content segments related to a current portion of content based on a characteristic). The content data may also include user profiles used to determine likelihoods of the user navigating away from or to a content portion or segment. For example, content data may include information characterizing content such as the director, producer, actors, activities occurring during the content, locations the content was created, any description of the content context or the content production, or any suitable combination thereof.

Applications may be, for example, stand-alone applications implemented on devices. For example, the application may be implemented as software or a set of executable instructions which may be stored in storage 508 and executed by control circuitry 504 of each one of device 500 and user equipment system 501. In some embodiments, applications may be client-server applications where only a client application resides on the device, and server application resides on a remote server. For example, applications may be implemented partially as a client application on control circuitry 504 of each one of device 500 and user equipment system 501 and partially on a remote server as a server application (e.g., content data source 618) running on control circuitry of the remote server. When executed by control circuitry of the remote server (such as content data source 618), the application may instruct the control circuitry to generate the content displays and transmit the generated displays to the devices. The server application may instruct the control circuitry of the content data source 618 to transmit data for storage on the device. The client application may instruct control circuitry of the receiving user equipment to generate the content displays.

Content and/or content data delivered to devices 602, 604, and 606 may be OTT content. OTT content delivery allows Internet-enabled user devices, including any device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide content data described above.

Content output system 600 is intended to illustrate a number of approaches, or network configurations, by which devices and sources of content and content data may communicate with each other for the purpose replacing a video frame affected by reduced streaming quality with a suitable replacement video frame or video frames. The embodiments described herein may be applied in any one or a subset of these approaches, or in a system employing other approaches for delivering content. The following four approaches provide specific illustrations of the generalized example of FIG. 6.

In one approach, devices may communicate with each other within a home network. Devices may communicate with each other directly via short-range point-to-point communication schemes described above, via indirect paths through a hub or other similar device provided on a home network, or via communications network 614. Each of the multiple individuals in a single home may operate different devices on the home network. As a result, it may be desirable for various content application information or settings to be communicated between the different devices. For example, it may be desirable for users to maintain consistent application settings on different devices within a home network, as described in greater detail in Ellis et al., U.S. Patent Publication No. 2005/0261827, filed Jul. 11, 2005. Different types of devices in a home network may also communicate with each other to transmit content. For example, a user may use content navigation button 120 on one device while the content is transmitted to a second device to be generated for display.

In a second approach, users may have multiple types of user equipment by which they access content. For example, some users may have home networks that are accessed by in-home and mobile devices. Users may control in-home devices via an application implemented on a remote device. For example, users may access an online application on a website via a personal computer at their office, or a mobile device such as a PDA or web-enabled mobile telephone. The user may set various settings (e.g., recordings, reminders, content segment buffering enablement, or other settings) on the online content application to control the user's in-home equipment. The online application may control the user's equipment directly, or by communicating with an application on the user's in-home equipment. Various systems and methods for devices communicating, where the devices are in locations remote from each other, is discussed in, for example, Ellis et al., U.S. Pat. No. 8,046,801, issued Oct. 25, 2011, which is hereby incorporated by reference herein in its entirety.

In a third approach, users of devices inside and outside a home may use their application to communicate directly with content source 616 to access content. Specifically, within a home, users of user television equipment 602 and user computer equipment 604 may access the application to navigate among and locate desirable content. Users may also access the application outside of the home using wireless user communications devices 606 to navigate among and locate desirable content.

In a fourth approach, devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud may include a collection of server computing devices, which may be located centrally or at distributed locations, that provide cloud-based services to various types of users and devices connected via a network such as the Internet via communications network 614. These cloud resources may include one or more content sources 616 and one or more content data sources 618. In addition or in the alternative, the remote computing sites may include other devices, such as user television equipment 602, user computer equipment 604, and wireless user communications device 606. For example, the other devices may provide access to a stored copy of a video or a streamed video. In such embodiments, devices may operate in a peer-to-peer manner without communicating with a central server.

The cloud provides access to services, such as content storage, content sharing, or social networking services, among other examples, as well as access to any content described above, for devices. Services may be provided in the cloud through cloud computing service providers, or through other providers of online services. For example, the cloud-based services may include a content storage service, a content sharing site, a social networking site, or other services via which user-sourced content is distributed for viewing by others on connected devices. These cloud-based services may allow a device to store content to the cloud and to receive content from the cloud rather than storing content locally and accessing locally-stored content.

Cloud resources may be accessed by a device using, for example, a web browser, an application, a desktop application, a mobile application, and/or any combination of access applications of the same. The device may be a cloud client that relies on cloud computing for application delivery, or the device may have some functionality without access to cloud resources. For example, some applications running on the device may be cloud applications, i.e., applications delivered as a service over the Internet, while other applications may be stored and run on the device. In some embodiments, a user device may receive content from multiple cloud resources simultaneously. For example, a user device may stream audio from one cloud resource while downloading content from a second cloud resource. Or a user device may download content from multiple cloud resources for more efficient downloading. In some embodiments, devices may use cloud resources for processing operations such as the processing operations performed by processing circuitry described in relation to FIG. 5.

Any one or more of device 500 and user equipment system 501 of FIG. 5 and user television equipment 602, user computer equipment 604, and wireless user communications device 606 of FIG. 6 may be used to identify a suitable replacement video frame or frames for display when streaming quality is reduced such that a synchronization between streamed video frames and audio cannot be maintained. For example, the content applications, associated with user devices, of the present disclosure may store video frames from which at least one replacement video frame will be determined as a suitable replacement for a currently streamed video frame. Further details of the present disclosure are discussed below in connection with the flowcharts of FIGS. 7-9. It should be noted that the steps of processes 700, 800, and 900 of FIGS. 7-9, respectively, may be performed by control circuitry 504 of FIG. 5. Control circuitry 504 may be part of a device having a display 512 (e.g., a device that may have any or all of the functionality of user television equipment 602, user computer equipment 604, and/or wireless communications device 606 of FIG. 6 such as user device 410 of FIG. 4), part of a remote server separated from the user equipment by way of a communications network (e.g., communications network 614 of FIG. 6), or distributed over a combination of both.

Figure 7:
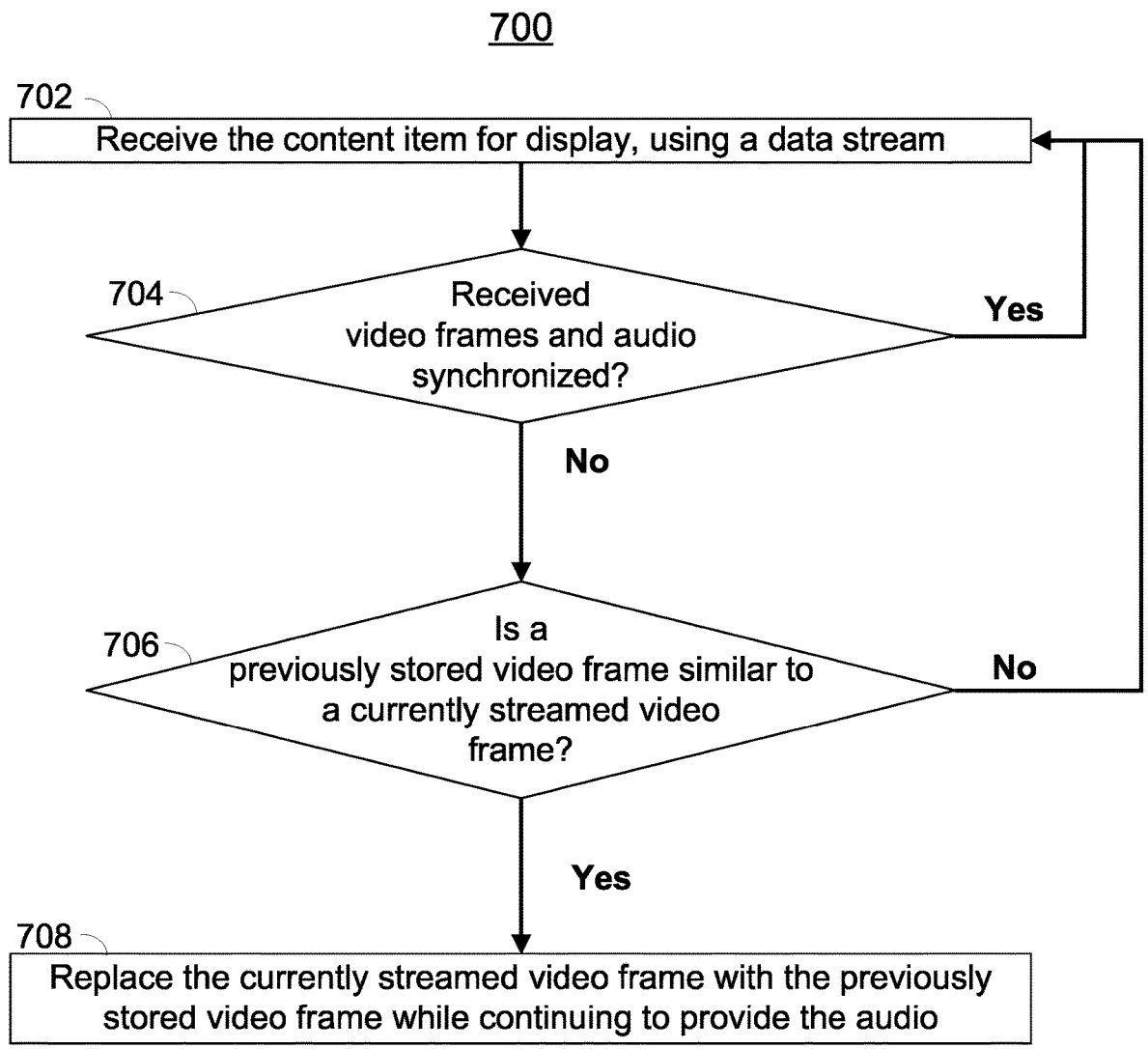
FIG. 7 depicts a flowchart of an illustrative process for replacing a video frame with a previously stored video frame, in accordance with at least some embodiments of the disclosure.

FIG. 7 depicts a flowchart of illustrative process 700 for replacing a video frame with a previously stored video frame, in accordance with at least some embodiments of the disclosure.

At step 702, the content application receives a content item for display, using a data stream. The content application may cause a device to receive a content item. For example, a content application hosted on a remote server is communicatively linked to a device and a content provider such that the content application facilitates the transmission of the content item from the content provider to the device. In some embodiments, the content application residing on a device receives the content item. For example, the content application executed by the control circuitry of a device receives the content item on the device. The data stream may be communicated over any suitable communications path (e.g., communications paths 608, 610, 612, 620, and 622). In some embodiments, the content application causes the content item to be transmitted over the data stream on the communications path.

At step 704, the content application determines whether the quality of streaming the video frames has reduced such that a synchronization between the video frames and the audio cannot be maintained. For example, the content application determines that the bit rate of the data stream has decreased below a threshold bit rate. The threshold bit rate may be pre-determined such that, at bit rates below the threshold, an audio stream continues to be transmitted while a video stream is not. If the synchronization between the video frames and the audio can be maintained, the content application returns to step 702 to continue receiving the content item using the data stream. If the synchronization between the video frames and the audio cannot be maintained, the content application proceeds to step 706.

At step 706, the content application determines whether a previously stored video frame of the video frames that is similar to a currently streamed video frame exists. In some embodiments, the content application stores the video frames received using the data stream and selects, from those video frames, a suitable replacement video frame that is similar to the currently streamed video frame. For example, the content application stores video frames from camera angles 111-113. The content application, to determine whether a video frame of the stored video frames is similar to a currently streamed video frame at normally presented camera angle 114, compares the scene of the currently streamed video frame to the scenes of the stored video frames. The content application may determine that a video frame of camera angle 111 is from the same scene as the currently streamed video frame (e.g., a similar video frame that preserves scene continuity). If the content application cannot find a previously stored video frame that is similar to the currently streamed video frame, the content application returns to step 702 to receive the content item and determine, in step 704, whether the streaming quality has sufficiently increased such that the video and audio are synchronized for presentation. Although not depicted, the content application may, after determining there is no similar video frame for replacement, resort to displaying a buffering notification. If the content application determines that a previously stored video frame is similar to the currently streamed video frame, the content application proceeds to step 708.

At step 708, the content application replaces, based on the determination in step 706, the currently streamed video frame with the previously stored video frame while continuing to provide audio. The replacement may have the benefit of increasing the appearance that the video is synchronized with the audio instead of displaying a frozen video frame of an actor whose lip movements are halted mid-word. Although not shown, process 700 may proceed after step 708 to the content application determining that the streaming quality has sufficiently increased such that the video frame stream is synchronized with the audio stream. The content application may monitor the bit rate of the data stream such that the bit rate is able to support synchronized video and audio streams for a threshold amount of time. Once the threshold time is reached, the content application may cause the normally presented stream of video frames to be displayed along with the streamed audio.

Figure 8:
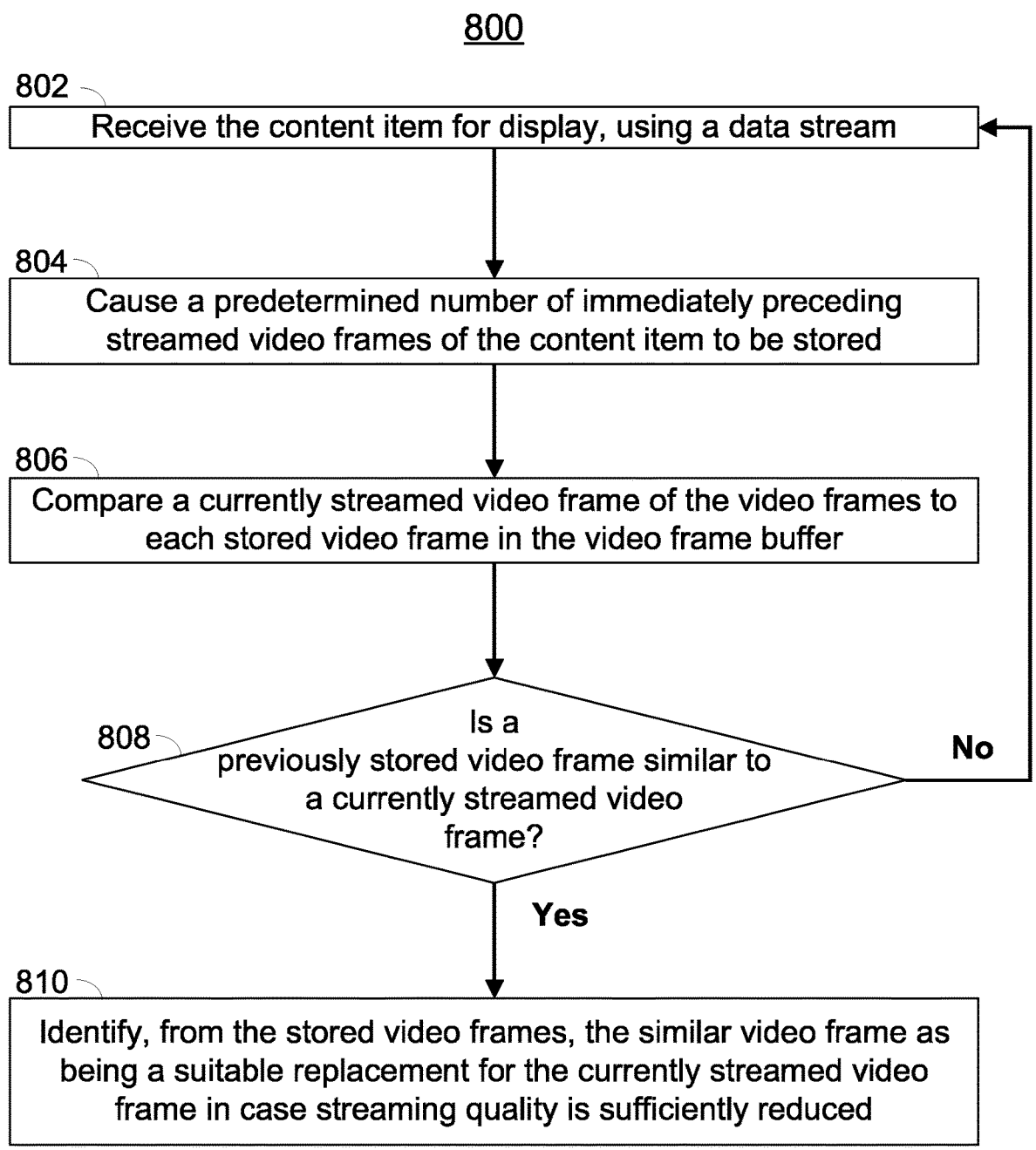
FIG. 8 depicts a flowchart of an illustrative process for storing, in a buffer, video frames that are identified as being similar to a currently streamed video frame, in accordance with at least some embodiments of the disclosure.

FIG. 8 depicts a flowchart of illustrative process 800 for storing, in a buffer, video frames that are identified as being similar to a currently streamed video frame, in accordance with at least some embodiments of the disclosure.

At step 802, the content application receives the content item for display, using a data stream. Like step 702 of process 700, the content application may cause a device to receive a content item. For example, a content application hosted on a remote server is communicatively linked to a device and a content provider such that the content application facilitates the transmission of the content item from the content provider to the device. In some embodiments, the content application residing on a device receives the content item. For example, the content application executed by the control circuitry of a device receives the content item on the device. The data stream may be communicated over any suitable communications path (e.g., communications paths 608, 610, 612, 620, and 622). In some embodiments, the content application causes the content item to be transmitted over the data stream on the communications path.

At step 804, the content application causes a predetermined number of immediately preceding streamed video frames of the content item to be stored in a video frame buffer. In some embodiments, the content application instructs a user device to store a predetermined number of video frames that immediately precede a currently streamed video frame to local memory (e.g., local memory 412). For example, the content application causes the 100 frames immediately preceding the currently streamed video frame of camera angle 114 (e.g., the video frames of camera angle 113) to be stored in local memory. In some embodiments, the content application instructs a remote storage (e.g., a cloud server) to store the predetermined number of video frames. For example, the content application instructs a cloud server to store the 300 frames immediately preceding the currently streamed video frame of camera angle 114 (e.g., the video frames of camera angles 111-113).

At step 806, the content application compares a currently streamed video frame to each stored video frame in the video frame buffer. In some embodiments, the content application compares the scene of the currently streamed video frame to the scenes of the stored video frames. The content application may determine that a video frame of camera angle 111 is from the same scene as the currently streamed video frame (e.g., a similar video frame that preserves scene continuity). The content application may compare the time difference between when video frames are streamed, compare the color gradient between the colors of consecutive video frames, use machine vision for identification of objects within a video frame, use any suitable image processing technique for object identification, or any combination thereof to determine scene continuity. In some embodiments, the content application determines the spoken dialogue associated with the currently streamed video frame, and compares the actor delivering the spoken dialogue to actors in the stored video frames in the video frame buffer. For example, the content application determines the spoken dialogue in the currently streamed video frame of camera angle 114 is a monologue delivered by a female actor. The content application may then use image processing to identify the female actor and determine the video frames within the video frame buffer that do not depict the female actor. In some embodiments, the content application identifies that the female actor is depicted in a video frame, but that the camera angle obscures her lip movements (e.g., the camera is behind the female actor and only her back is shown to the viewer). The content application may determine that this video frame is also suitable for replacing the currently streamed frame to accompany the audio of her spoken dialogue.

At step 808, the content application determines whether there is a previously stored video frame similar to a currently streamed video frame. If there is no previously stored video frame similar to the currently streamed video frame, the content application may return to step 802 to continue to receive the content item. Although not shown, the content application may also display a buffering notification if there is no previously stored video frame that is similar to the currently streamed video frame. The content application may determine a suitable replacement video frame within the same scene as the currently streamed video frame that does not depict the female actor delivering the spoken dialogue of the streaming audio. If there is a previously stored video frame similar to the currently streamed video frame, the content application proceeds to step 810.

At step 810, the content application identifies a video frame of the stored video frames as being a similar video frame to the currently streamed video frame such that the similar video frame can be used in place of the currently streamed video frame while the audio continues to be streamed in case the streaming quality is reduced such that a synchronization between the video frames and the audio cannot be maintained. The identification may be based upon the comparison in step 806. Although not shown, the content application may identify the video frame that is both similar to and furthest apart in time from the currently streamed video frame. For example, the content application may identify that video frames from both camera angles 111 and 113 are similar to a currently streamed video frame of camera angle 114 but select the video frame from camera angle 111 as the suitable replacement video frame because it was streamed longer ago than the video frame from camera angle 113 was.

Figure 9:
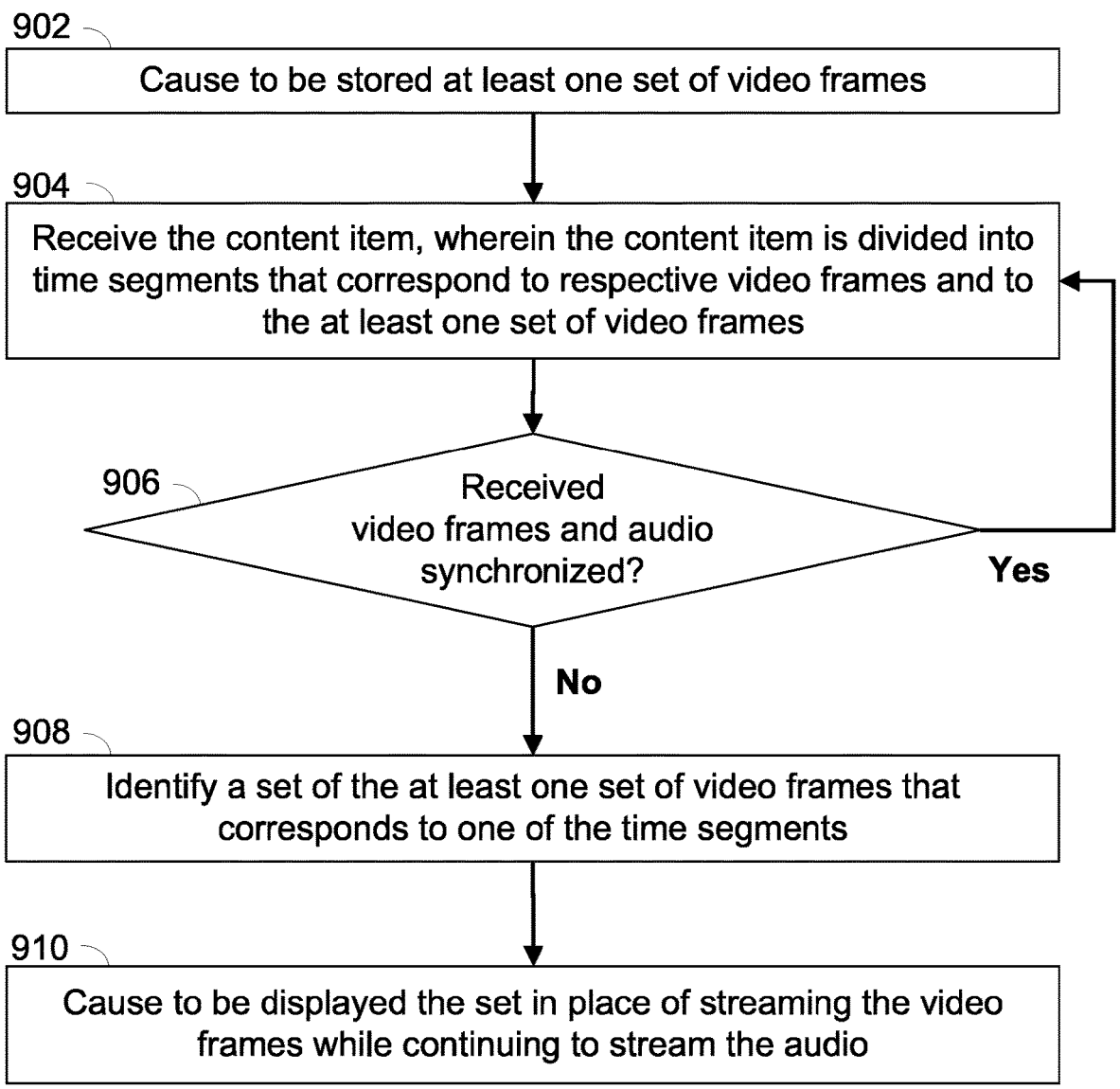
FIG. 9 depicts a flowchart of an illustrative process for causing to be displayed a video set in place of currently streamed video frames, in accordance with at least some embodiments of the disclosure.

FIG. 9 depicts a flowchart of illustrative process 900 for causing to be displayed a video set in place of currently streamed video frames, in accordance with at least some embodiments of the disclosure.

At step 902, the content application causes at least one set of video frames to be stored. As described in the descriptions of FIGS. 2 and 3, the content application may map sets of video frames of a content item to video frames of the content item prior to the content item being streamed to the device. The content application may store the pre-mapped sets of video frames and the metadata that indicates how the sets of video frames are mapped to time segments of the content item. For example, the content application causes pre-mapped sets of video frames of camera angles 302 and 304 to be stored such that when video frames of camera angles 301, 303, 305, or 306 are affected by a reduced streaming quality, the stored sets of video frames may be used appropriately to replace an affected video frame.

At step 904, the content application receives the content item using a data stream. In some embodiments, the content item is divided into time segments and each of the time segments corresponds to a respective video frame of the content item and to at least one of the stored sets of video frames. Like steps 702 of process 700 and 802 of process 800, the content application may cause a device to receive a content item. For example, a content application hosted on a remote server is communicatively linked to a device and a content provider such that the content application facilitates the transmission of the content item from the content provider to the device. In some embodiments, the content application residing on a device receives the content item. For example, the content application executed by the control circuitry of a device receives the content item on the device. The data stream may be communicated over any suitable communications path (e.g., communications paths 608, 610, 612, 620, and 622). In some embodiments, the content application causes the content item to be transmitted over the data stream on the communications path. The content application may receive both the content item and the metadata of the pre-mapping using the data stream. An entire metadata package of the pre-mapping may be received before the content application receives the content item. In some embodiments, the metadata is received throughout the streaming of the content item to a device. For example, the content application receives a portion of the metadata that is sized appropriately according to the storage capacity of the device or the network bandwidth between a device and a communication node (e.g., communication node 420) transmitting the data stream.

At step 906, the content application determines whether a quality of streaming the video frames has reduced during streaming a video frame that corresponds to one of the time segments such that the received video and audio of the content item are no longer synchronized. The content application may use any of the methods described in the description of FIG. 1 for determining that the quality of streaming the video has sufficiently reduced. For example, the content application determines that the bit rate of the data stream has decreased below a threshold bit rate. The threshold bit rate may be pre-determined such that, at bit rates below the threshold, an audio stream continues to be transmitted while a video stream is not. If the synchronization between the video frames and the audio can be maintained, the content application returns to step 904 to continue receiving the content item using the data stream. If the synchronization between the video frames and the audio cannot be maintained, the content application proceeds to step 908.

At step 908, the content application identifies, using the time segment of the currently streamed video frame, a set of the stored sets of video frames. For example, the content application uses the time segment 20:09 of a video frame associated with camera angle 114 to determine that a set of video frames from camera angle 111 is pre-mapped to the time segment 20:09. In some embodiments, the content application identifies multiple sets of the stored sets of video frames that are pre-mapped to a time segment. For example, the content application determines that stored sets from both camera angles 111 and 113 are pre-mapped to time segment 20:09.

At step 910, the content application causes the set of video frames to be displayed in place of the currently streamed video frame or video frames while continuing to stream the audio. For example, the content application causes the set of stored video frames of camera angle 111 to be displayed in place of the currently streamed video frame at camera angle 114 that is affected by the reduction in streaming quality. If the streamed video frames and audio are out of synchronization for longer than the duration of the set of stored video frames, the content application may cause the set of stored video frames to be repeated or display another set of stored video frames that are pre-mapped to the currently streamed video frame. For example, if the streaming quality causes the audio and video frames to be out of synchronization for 3 seconds, which is longer than the 2-second duration of the video frames of camera angle 111, the content application repeats the video frames of camera angle 111 until the streaming quality is sufficiently increased. In some embodiments, the content application identifies that both a set of video frames of camera angle 111 and a set of video frames of camera angle 113 are pre-mapped to the currently streamed video frame. The content application may choose to display the set of video frames with a longer duration in place of the currently streamed video frame. When the streaming quality is unable to support synchronized video and audio streaming, the content application may repeat the longer video frame set or play multiple pre-mapped sets of video frames in a decreasing order of duration. For example, when sets of video frames of both camera angles 111 and 113 are pre-mapped to time segment 20:09, the content application chooses to display the 4-second-long set of video frames of 113 first and the 2-second-long set of video frames of 111 afterward. Although not depicted, the content application may proceed after step 910 to determine that the streaming quality has sufficiently increased such that the synchronization between the streamed video frames and audio can be maintained. After determining that the streaming quality has sufficiently increased, the content application may resume display of the streamed video frames and audio. The content application may monitor the streaming quality for stability before resuming display of the streamed video frames and audio. For example, the content application determines that the streaming quality is sufficiently high for a threshold amount of time before resuming display of the streamed video frames and audio.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   receiving a segment of a content item for display in a streaming session;
   analyzing a quality of the segment;
   determining that the quality of the segment of the content item does not comply with a predetermined standard;
   in response to determining that the quality of the segment of the content item does not comply with the predetermined standard, comparing a currently streamed video frame of the content item to a previously stored video frame of the content item from the same streaming session;
   determining a replacement portion based on the comparing, wherein the replacement portion is identified prior to the determining that the quality of the segment of the content item does not comply with the predetermined standard, and wherein the replacement portion is based on the previously stored video frame of the content item from the same streaming session;
   replacing a portion of the segment with the replacement portion; and
   generating for output the currently streamed video frame including the portion of the segment replaced with the replacement portion.

2. The method of claim 1, further comprising:
   determining, using the control circuitry, that the previously stored video frame is similar to the currently streamed video frame; and
   determining that the similar previously stored video frame can be used in place of the currently streamed video frame as the replacement portion,
   wherein the similar previously stored video frame shows scene continuity with the currently streamed video frame, and
   wherein the comparing the currently streamed video frame to the previously stored video frame comprises comparing a scene including the currently streamed video frame to a scene including the previously stored video frame.

3. The method of claim 1, wherein the replacing the portion of the segment with the replacement portion comprises at least one of replacing a video frame affected by the non-compliant quality with the previously stored video frame, replacing a video frame with a previously stored video frame while continuing to provide audio, or replacing the currently streamed video frame with a similar video frame that occurred as long ago in time as possible relative to the currently streamed video frame.

4. The method of claim 1, wherein the replacing the portion of the segment with the replacement portion comprises replacing the segment of the content item with pre-curated video frames.

5. The method of claim 1, wherein the previously stored video frame has a second camera angle and the currently streamed video frame has a first camera angle, wherein the first camera angle is different than the second camera angle, and wherein the replacing the portion of the segment with the replacement portion comprises replacing, based on determining the previously stored video frame having the second camera angle is similar to the currently streamed video frame having the first camera angle, the currently streamed video frame having the first camera angle with the previously stored video frame having the second camera angle while continuing to provide audio.

6. A system comprising:
   input circuitry configured to:
     receive a segment of a content item for display in a streaming session; and
   control circuitry configured to:
     analyze a quality of the segment;
     determine that the quality of the segment of the content item does not comply with a predetermined standard;
     in response to determining that the quality of the segment of the content item does not comply with the predetermined standard, compare a currently streamed video frame of the content item to a previously stored video frame of the content item from the same streaming session;
determine a replacement portion based on the comparing, wherein the replacement portion is identified prior to the determining that the quality of the segment of the content item does not comply with the predetermined standard, and wherein the replacement portion is based on the previously stored video frame of the content item from the same streaming session;
replace a portion of the segment with the replacement portion; and
generate for output the currently streamed video frame including the portion of the segment replaced with the replacement portion.

7. The system of claim 6, the control circuitry further configured to:
determine, using the control circuitry, that the previously stored video frame is similar to the currently streamed video frame; and
determine that the similar previously stored video frame can be used in place of the currently streamed video frame as the replacement portion,
wherein the similar previously stored video frame shows scene continuity with the currently streamed video frame, and
wherein the comparing the currently streamed video frame to the previously stored video frame comprises comparing a scene including the currently streamed video frame to a scene including the previously stored video frame.

8. The system of claim 6, wherein the replacing the portion of the segment with the replacement portion comprises at least one of replacing a video frame affected by the non-compliant quality with the previously stored video frame, replacing a video frame with a previously stored video frame while continuing to provide audio, or replacing the currently streamed video frame with a similar video frame that occurred as long ago in time as possible relative to the currently streamed video frame.

9. The system of claim 6, wherein the replacing the portion of the segment with the replacement portion comprises replacing the segment of the content item with pre-curated video frames.

10. The system of claim 6, wherein the previously stored video frame has a second camera angle and the currently streamed video frame has a first camera angle, wherein the first camera angle is different than the second camera angle, and wherein the replacing the portion of the segment with the replacement portion comprises replacing, based on determining the previously stored video frame having the second camera angle is similar to the currently streamed video frame having the first camera angle, the currently streamed video frame having the first camera angle with the previously stored video frame having the second camera angle while continuing to provide audio.

11. A non-transitory computer-readable medium having instructions encoded thereon that when executed by control circuitry performs a method comprising:
receiving a segment of a content item for display in a streaming session;
analyzing a quality of the segment;
determining that the quality of the segment of the content item does not comply with a predetermined standard;
in response to determining that the quality of the segment of the content item does not comply with the predetermined standard, comparing a currently streamed video frame of the content item to a previously stored video frame of the content item from the same streaming session;
determining a replacement portion based on the comparing, wherein the replacement portion is identified prior to the determining that the quality of the segment of the content item does not comply with the predetermined standard, and wherein the replacement portion is based on the previously stored video frame of the content item from the same streaming session;
replacing a portion of the segment with the replacement portion; and
generating for output the currently streamed video frame including the portion of the segment replaced with the replacement portion.

12. The non-transitory computer-readable medium of claim 11, the method further comprising:
determining, using the control circuitry, that the previously stored video frame is similar to the currently streamed video frame; and
determining that the similar previously stored video frame can be used in place of the currently streamed video frame as the replacement portion,
wherein the similar previously stored video frame shows scene continuity with the currently streamed video frame, and
wherein the comparing the currently streamed video frame to the previously stored video frame comprises comparing a scene including the currently streamed video frame to a scene including the previously stored video frame.

13. The non-transitory computer-readable medium of claim 11, wherein the replacing the portion of the segment with the replacement portion comprises at least one of replacing a video frame affected by the non-compliant quality with the previously stored video frame, replacing a video frame with a previously stored video frame while continuing to provide audio, replacing the currently streamed video frame with a similar video frame that occurred as long ago in time as possible relative to the currently streamed video frame, or replacing the segment of the content item with pre-curated video frames.

14. The non-transitory computer-readable medium of claim 11, wherein the previously stored video frame has a second camera angle and the currently streamed video frame has a first camera angle, wherein the first camera angle is different than the second camera angle, and wherein the replacing the portion of the segment with the replacement portion comprises replacing, based on determining the previously stored video frame having the second camera angle is similar to the currently streamed video frame having the first camera angle, the currently streamed video frame having the first camera angle with the previously stored video frame having the second camera angle while continuing to provide audio.

15. The method of claim 1, comprising:
generating for output the currently streamed video frame including the portion of the segment replaced with the replacement portion without generating a buffering notification.

16. The method of claim 1, comprising:
generating for output the currently streamed video frame including the portion of the segment replaced with the replacement portion without communicating with a central server or a cloud resource.

17. The system of claim 6, wherein the control circuitry is configured to:

generate for output the currently streamed video frame including the portion of the segment replaced with the replacement portion without generating a buffering notification.

18. The system of claim 6, wherein the control circuitry is configured to:

generate for output the currently streamed video frame including the portion of the segment replaced with the replacement portion without communicating with a central server or a cloud resource.

19. The non-transitory computer-readable medium of claim 11, wherein the method comprises:

generating for output the currently streamed video frame including the portion of the segment replaced with the replacement portion without generating a buffering notification.

20. The non-transitory computer-readable medium of claim 11, wherein the method comprises:

generating for output the currently streamed video frame including the portion of the segment replaced with the replacement portion without communicating with a central server or a cloud resource.

21. The method of claim 1, wherein the determining the replacement portion is further based on at least one of scene continuity, a change in scene, chronological order, or dialogue association.

22. The method of claim 21, wherein the determining the replacement portion is further based on the scene continuity, the change in the scene, the chronological order, and the dialogue association.

23. The system of claim 6, wherein the control circuitry configured to determine the replacement portion is further configured to be based on at least one of scene continuity, a change in scene, chronological order, or dialogue association.

24. The system of claim 23, wherein the control circuitry configured to determine the replacement portion is further configured to be based on the scene continuity, the change in the scene, the chronological order, and the dialogue association.

25. The non-transitory computer-readable medium of claim 11, wherein the determining the replacement portion is further based on at least one of scene continuity, a change in scene, chronological order, or dialogue association.

26. The non-transitory computer-readable medium of claim 25, wherein the determining the replacement portion is further based on the scene continuity, the change in the scene, the chronological order, and the dialogue association.

* * * * *